United States Patent
Gordon et al.

(10) Patent No.: US 11,923,581 B2
(45) Date of Patent: Mar. 5, 2024

(54) AQUEOUS REDOX FLOW BATTERY ELECTROLYTES WITH HIGH CHEMICAL AND ELECTROCHEMICAL STABILITY, HIGH WATER SOLUBILITY, LOW MEMBRANE PERMEABILITY

(71) Applicant: President and Fellows of Harvard College, Cambridge, MA (US)

(72) Inventors: Roy G. Gordon, Cambridge, MA (US); Michael J. Aziz, Cambridge, MA (US); Eugene Beh, Arlington, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 114 days.

(21) Appl. No.: 16/324,951

(22) PCT Filed: Aug. 14, 2017

(86) PCT No.: PCT/US2017/046783
§ 371 (c)(1),
(2) Date: Feb. 12, 2019

(87) PCT Pub. No.: WO2018/032003
PCT Pub. Date: Feb. 15, 2018

(65) Prior Publication Data
US 2020/0373599 A1     Nov. 26, 2020

Related U.S. Application Data

(60) Provisional application No. 62/396,563, filed on Sep. 19, 2016, provisional application No. 62/374,075, filed on Aug. 12, 2016.

(51) Int. Cl.
*H01M 8/18*  (2006.01)
*C07F 15/02* (2006.01)
*H01M 8/08*  (2016.01)

(52) U.S. Cl.
CPC ............ *H01M 8/188* (2013.01); *C07F 15/02* (2013.01); *H01M 8/08* (2013.01); *H01M 2300/0002* (2013.01)

(58) Field of Classification Search
CPC ............ H01M 8/18–188; H01M 8/08; H01M 2300/0002; C07F 15/00
See application file for complete search history.

(56) References Cited

U.S. PATENT DOCUMENTS 3,238,066 A   3/1966   Klass et al.
3,288,641 A   11/1966  Rightmire
(Continued)

FOREIGN PATENT DOCUMENTS

CN   102035007 A   4/2011
CN   103000924 A   3/2013
(Continued)

OTHER PUBLICATIONS

EPO machine English translations of CN 103288886 originally published to Bi Fuqiang on Sep. 11, 2013 (Year: 2013).*

(Continued)

*Primary Examiner* — Cynthia H Kelly
*Assistant Examiner* — Niara Trant
(74) *Attorney, Agent, or Firm* — Clark & Elbing LLP

(57) ABSTRACT

The invention features redox flow batteries and compound useful therein as negolytes or posolytes. The batteries and compounds are advantageous in terms of being useable in water solutions at neutral pH and have extremely high capacity retention. Suitable negolytes are diquaternized bipyridines, suitable posolytes are water-soluble ferrocene derivatives.

2 Claims, 15 Drawing Sheets

(56) References Cited

U.S. PATENT DOCUMENTS

| | | | |
|---|---|---|---|
| 3,300,342 | A | 1/1967 | Klass |
| 4,578,323 | A | 3/1986 | Hertl et al. |
| 4,652,355 | A | 3/1987 | Noding |
| 4,711,828 | A | 12/1987 | Ishida et al. |
| 6,020,105 | A | 2/2000 | Wariishi |
| 6,033,784 | A | 3/2000 | Jacobsen et al. |
| 9,837,679 | B2 | 12/2017 | Reece |
| 9,939,701 | B2 * | 4/2018 | Baumann ............... C09K 9/02 |
| 9,966,622 | B2 | 5/2018 | Huskinson et al. |
| 10,847,829 | B2 | 11/2020 | Huskinson et al. |
| 10,934,258 | B2 | 3/2021 | Liu et al. |
| 2002/0088576 | A1 | 7/2002 | Andoh et al. |
| 2006/0194151 | A1 | 8/2006 | Inagaki et al. |
| 2007/0134520 | A1 | 6/2007 | Shimomura et al. |
| 2007/0184309 | A1 | 8/2007 | Gust, Jr. et al. |
| 2009/0017379 | A1 | 1/2009 | Inatomi et al. |
| 2009/0094822 | A1 | 4/2009 | Ohtsuka et al. |
| 2010/0112393 | A1 | 5/2010 | Knuckey et al. |
| 2011/0027624 | A1 | 2/2011 | Deane et al. |
| 2011/0045332 | A1 | 2/2011 | Horne et al. |
| 2011/0189520 | A1 | 8/2011 | Carter et al. |
| 2011/0223450 | A1 | 9/2011 | Horne et al. |
| 2011/0284456 | A1 | 11/2011 | Brozell |
| 2013/0157162 | A1 | 6/2013 | Dong et al. |
| 2014/0051003 | A1 | 2/2014 | Esswein et al. |
| 2014/0186731 | A1 | 7/2014 | Pham et al. |
| 2014/0370403 | A1 | 12/2014 | Narayan et al. |
| 2015/0079497 | A1 | 3/2015 | Lavastre et al. |
| 2015/0104724 | A1 | 4/2015 | Chang et al. |
| 2015/0176037 | A1 | 6/2015 | Amao et al. |
| 2015/0207165 | A1 | 7/2015 | Schubert et al. |
| 2015/0243991 | A1 | 8/2015 | Huskinson et al. |
| 2016/0043423 | A1 | 2/2016 | Huskinson et al. |
| 2016/0105042 | A1 | 4/2016 | Taylor et al. |
| 2016/0229803 | A1 | 8/2016 | Lin et al. |
| 2016/0248114 | A1 | 8/2016 | Huskinson et al. |
| 2017/0046783 | A1 | 2/2017 | Hosman et al. |
| 2017/0279148 | A1 | 9/2017 | Stahl et al. |
| 2017/0291916 | A1 | 10/2017 | Millard |
| 2018/0048011 | A1 | 2/2018 | Aziz et al. |
| 2018/0219241 | A1 | 8/2018 | Chen et al. |

FOREIGN PATENT DOCUMENTS

| | | | |
|---|---|---|---|
| CN | 103288886 A | * | 9/2013 |
| CN | 104592314 A | * | 5/2015 |
| EP | 0911893 A1 | | 4/1999 |
| JP | S5028645 A | | 3/1975 |
| JP | S6273577 A | | 4/1987 |
| JP | H0419966 A | | 1/1992 |
| JP | 0758625 B2 | | 6/1995 |
| JP | H08185868 A | | 7/1996 |
| JP | 2002-100398 A | | 4/2002 |
| KR | 20100040606 A | | 4/2010 |
| WO | WO-2006/129635 A1 | | 12/2006 |
| WO | WO-2011/131959 A1 | | 10/2011 |
| WO | WO-2014/204985 A1 | | 12/2014 |
| WO | WO-2016/156451 A1 | | 10/2016 |
| WO | WO-2020/072406 A2 | | 4/2020 |

OTHER PUBLICATIONS

"V.I. Boev, Betain Dimetil-Sul'Fopropil (Ferrocenilmetil)-Ammoniya-Novyiy Ferrocenilmetilruyushchiiy Reagent, 1991, Zhurnal obshchey khimii, vol. 61, Issue 5, pp. 1-4". (Year: 1991).*

STIC English Translation of Betain Dimetil-Sul'Fopropil (Ferrocenilmetil)-Ammoniya-Novyiy Ferrocenilmetilruyushchiiy Reagent, originally published to V.I. Boev in 1991 (Year: 1991).*

EPO English Machine Translation of CN 104592314 originally published to He H on May 6, 2015 (Year: 2015).*

"Alexandra Georgopoulou, Bifunctional ferrocene derivatives for molecular recognition of DNA duplexes, 2000, J Chem. Soc., Dalton Trans., 2000, 2969-2974" https://pubs.rsc.org/en/content/articlepdf/2000/dt/b004295I (Year: 2000).*

Alt et al., "Evaluation of organic battery electrodes: voltammetric study of the redox behaviour of solid quinones," J Appl Electrochem. 2(3):193-200 (1972).

Beh et al., "A Neutral pH Aqueous Organic-Organometallic Redox Flow Battery with Extremely High Capacity Retention," ACS Energy Lett. 2(3):639-44 (2017).

Bird et al., "Electrochemistry of the viologens," Chem Soc Rev. 10:49-82 (1981).

Borisova et al., "Simple Preparative Synthesis of Spinochrome E, a Pigment from Sea Urchins of the Genus Echinothrix," Chem Nat Comp. 48(2):202-4 (2012).

Chen et al., "A quinone-bromide flow battery with 1 W/cm2 power density," published in final form as: J Electrochem Soc. 163(1):A5010-3 (2016) (9 pages) (author manuscript).

Conant et al., "Free and total energy changes in the reduction of quinones," J Am Chem Soc. 44(11):2480-93 (1922).

Conant et al., "Reduction potentials of quinones. I. The effect of the solvent on the potentials of certain benzoquinones," J Am Chem Soc. 45(9):2194-218 (1923).

Conant et al., "Reduction potentials of quinones. II. The potentials of certain derivatives of benzoquinone, naphthoquinone and anthraquinone," J Am Chem Soc. 46(8):1858-1881 (1924).

Costentin et al., "Electrochemical approach to the mechanistic study of proton-coupled electron transfer," Chem Rev. 108(7):2145-79 (2008).

Darling et al. "Transport property requirements for flow battery separators," J Electrochem Soc. 163(1):A5029-40 (2016).

Diaz, "Analytical applications of 1,10-anthraquinones: A review," Talanta. 38(6):571-88 (1991).

EMD Millipore Corporation "Pyridinium chloride for synthesis—Material Safety Data Sheet," revised Aug. 22, 2013 (9 pages).

Er et al., "Computational design of molecules for an all-quinone redox flow battery," Chem Sci. 6(2):885-93 (2015) (10 pages).

Erlebacher et al. "Evolution of nanoporosity in dealloying," Nature. 410(6827):450 (2001).

Gerhardt et al., "Anthraquinone derivatives in aqueous flow batteries," Adv Energy Mater. 7(8):1601488 (2017) (9 pages).

Goulet et al., "Flow battery molecular reactant stability determined by symmetric cell cycling methods," J Electrochem Soc. 165(7):A1466-77 (2018) (23 pages).

Hori, Chapter 3: Electrochemical CO2 reduction on metal electrodes. *Modern aspects of electrochemistry.* C. Vayenas et al., 89-189 (2008).

Hull et al., "Reversible hydrogen storage using CO2 and a proton-switchable iridium catalyst in aqueous media under mild temperatures and pressures," Nat Chem. 4(5):383-8 (2012).

Hunyh et al., "Quinone 1 e- and 2 e-/2 H+ reduction potentials: identification and analysis of deviations from systematic scaling relationships," J Am Chem Soc. 138(49):15903-10 (2016) (23 pages).

Huskinson et al., "A high power density, high efficiency hydrogen-chlorine regenerative fuel cell with a low precious metal content catalyst," Energy Environ Sci. 5(9):8690-98 (2012).

Huskinson et al., "A metal-free organic-inorganic aqueous flow battery," Nature. 505(7482):195-8 (2014) (16 pages).

Huskinson et al., "Cycling of a quinone-bromide flow battery for large-scale electrochemical energy storage," published in final form as: ECS Trans. 61(37):27-30 (2014) (4 pages) (author manuscript).

Huskinson et al., "Novel quinone-based couples for flow batteries," published in final form as: ECS Trans. 53(7):101-5 (2013) (5 pages) (author manuscript).

International Search Report and Written Opinion for International Application No. PCT/US17/46783, dated Nov. 3, 2017 (12 pages).

Karandur et al. "Solubility and aggregation of Gly(5) in water," J Phys Chem B. 118(32):9565-72 (2014).

Khatee et al., "Differential pH as a method for increasing cell potential in organic aqueous flow batteries," J Mater Chem A. 5(41):21875-82 (2017).

Knox et al., "134. Ferrocene derivatives. Part VII. Some sulphur derivatives," J Chem Soc. 692-96 (1958).

(56) References Cited

OTHER PUBLICATIONS

Krishnan et al., "Reduction potentials for 2,2'-bipyridine and 1,10-phenanthroline couples in aqueous solutions," J Am Chem Soc. 105(17):5617-23 (1983).
Kwabi et al., "Alkaline quinone flow battery with long lifetime at pH 12," Joule. 2:1894-1906 (2018) (14 pages).
Li et al., "$CO_2$ reduction at low overpotential on Cu electrodes resulting from the reduction of thick $Cu_2O$ films," J Am Chem Soc. 134(17):7231-4 (2012).
Lin et al., "A redox-flow battery with an alloxazine-based organic electrolyte, " Nature Energy. 1(9):16102 (2016) (38 pages).
Lin et al., "Alkaline quinone flow battery," Science. 349(6255):1529-32 (2015) (28 pages).
Liu et al., "A Total Organic Aqueous Redox Flow Battery Employing a Low Cost and Sustainable Methyl Viologen Anolyte and 4-HO-TEMPO Catholyte," Adv Energy Mater. 6(3):1501449 (2016).
Mondal et al. "Alloy oxide electrocatalysts for regenerative hydrogen-halogen fuel cell," Mater Res Soc Symp Proc. GG10.9:1311 (2010).
Mortimer et al., "Electrochemic materials," Chem Soc Rev. 26(3):147-56 (1997).
National Center for Biotechnology Information. "PubChem substance record for SID 234866994, SCHEMBL9466422, source: SureChEMBL." PubChem, <https://pubchem.ncbi.nlm.nih.gov/substance/234866994>, Accessed Dec. 2, 2020 (7 pages).
Nawar et al., "Benzoquinone-hydroquinone couple for flow battery," published in final form as: MRS Proceedings. 1491:mrsf12-1491 (2013) (6 pages) (author manuscript).
Nielson et al., "Electron Self-Exchange Kinetics for a Water-Soluble Ferrocenium/Ferrocene Couple: Rate Modulation via Charge Dependent Calix[6]arene-p-sulfonate Encapsulation," Inorg Chem. 35(5):1402-4 (1996).
PubChem, Substance Record for SID 142148551, <https://pubchem.ncbi.nlm.nih.gov/substance/142148551#section=Top>, available date Aug. 20, 2012, retrieved Jun. 20, 2016 (6 pages).
Quan et al., "Voltammetry of quinones in unbuffered aqueous solution: reassessing the roles of proton transfer and hydrogen bonding in the aqueous electrochemistry of quinones," J Am Chem Soc. 129(42):12847-56 (2007).
Rasmussen, "A single substance organic redox flow battery," ESS, 2012 (Poster presentation).
Rieger et al., "Methyl viologen reactions. 5. Rates and mechanism of cation-radical formation in aqueous base," J Org Chem. 53(7):1481-85 (1988).
Smith et al., "The pH-Rate Profile for the Hydrolysis of a Peptide Bond," J Am Chem Soc. 120(35):8910-13 (1998).
Wang et al., "Anthraquinone with tailored structure for a nonaqueous metal-organic redox flow battery," Chem Commun (Camb). 48(53):6669-71 (2012).
Weber et al., "Redox flow batteries: a review," J Appl Electrochem 41:1137-64 (2011).
Xu et al., "A study of tiron in aqueous solutions for redox flow battery application," Electrochimica Acta. 55: 715-20 (2010).
Xu et al., "Novel organic redox flow batteries using soluble quinonoid compounds as positive materials," IEEE. (4 pages) (2009).
Yang et al., "High-performance aqueous organic flow battery with quinone-based redox couples at both electrodes," J Electrochem Soc. 163(7):A1442-49 (2016).
Yao et al., "High-capacity organic positive-electrode material based on a benzoquinone derivative for use in rechargeable lithium batteries," J Power Sources. 195(24): 8336-40 (2010).
Hu et al., "Long-Cycling Aqueous Organic Redox Flow Battery (AORFB) toward Sustainable and Safe Energy Storage," J Am Chem Soc. 139(3):1207-1214 (2017) (22 pages).

\* cited by examiner

AQUEOUS REDOX FLOW BATTERY ELECTROLYTES WITH HIGH CHEMICAL AND ELECTROCHEMICAL STABILITY, HIGH WATER SOLUBILITY, LOW MEMBRANE PERMEABILITY

STATEMENT REGARDING FEDERALLY SPONSORED RESEARCH

This invention was made with support under grant numbers DE-AC05-76RL01830 and DE-AR0000348 from the U.S. Department of Energy. The U.S. Government has certain rights to the invention.

TECHNICAL FIELD

This invention relates generally to energy storage. More specifically, the invention relates to a new class of compounds and their operation in a redox flow battery. The compounds are composed only of earth-abundant elements, having high chemical and electrochemical stability, and high water solubility. Depending on the exact composition of the compounds, they also show low permeability across anion (or cation) exchange membranes. The compounds are, among other uses, useful as electrolyte reactants in aqueous redox flow battery systems that can be operated at neutral or near neutral pH.

BACKGROUND OF THE INVENTION

Redox flow batteries (RFBs) represent a class of energy storage devices that are especially suited for large-scale stationary deployment. The cost of RFB electrolytes, which are the charge-storing materials, usually constitutes a large proportion of the cost of a complete RFB system.[1] For other system components, large cost savings are realized by utilizing water as the solvent for the electrolytes and carbon for the electrodes. Added costs may arise from the use of a corrosive supporting electrolyte such as sulfuric acid or potassium hydroxide. Furthermore, the toxic and corrosive nature of some electrolyte species, such as bromine, imposes other costs related to the choice of corrosion-resistant materials for pumps and storage tanks, while also restricting the range of potential applications of the RFB due to safety concerns.

A major challenge in making aqueous RFBs safe and economical is the identification of suitable electrolytes that have a high chemical stability and a high solubility in water at all states of charge, with a low rate of permeability across the RFB membrane. The chemical stability of the negolyte (negative electrolyte) and posolyte (positive electrolyte) species determines the long-term capacity of the RFB, and if the decomposition products are less soluble than the original reactants, a small proportion of decomposed material may be sufficient to cause significant degradation in the performance of the entire RFB. Such mechanisms include the formation of an insoluble film on the electrodes or membrane which raises the cell resistance, or the physical blockage of the flow channels, electrodes, and pumps which physically prevents the reactants from being circulated to and from the electrode surface, resulting in an increased amount of pumping energy required. Regardless, it is also important that the reactant molecules possess a high solubility in water because the solubility of negolyte and posolyte species is directly correlated with the energy density of the RFB system. In a RFB that has different reactants in the negolyte and posolyte reservoirs, the migration of electrolyte species across the RFB membrane manifests as an irreversible loss of cell capacity. It is therefore highly desirable to utilize electrolytes that combine high (electro) chemical stability, high water solubility, and low membrane permeability.

For operation at neutral or near-neutral pH, oxidation or reduction of the electrolyte species should not be coupled to proton transfer, otherwise large swings in the cell pH will occur. This is especially true when the electrolyte concentration is high; if a buffer is used to mitigate any large changes to the solution pH, the presence of the buffer will also adversely impact the solubility of the RFB reactants, and the ions from the buffer may lower the conductivity of the system.

One class of potential negolyte molecules that can undergo reversible redox at a low potential in neutral water is the viologens, of which methyl viologen (MV) is the smallest member. MV dichloride is highly soluble (3.0 M) in water at pH 7, and its one-electron reduction to the cation radical is not coupled to any proton transfer[2]. Viologens are also composed only of earth-abundant elements and are readily synthesized.

However, the cation radical (singly reduced) form of viologens is known to be significantly less soluble than the dication (oxidized) form. This property, coupled with the fact that the cation radical is strongly colored while the dication is not, has led to their exploitation as electrochromic materials.[3] While the cation radical form of MV is still soluble in water, precipitation from solution upon reduction may be a concern at very high concentrations.

Moreover, the cation radical of MV, as with other alkyl viologens, is susceptible to radical dimerization. An association constant of 385 $M^{-1}$ has been measured for the cation radical of MV diiodide dissolved in 1 M aqueous NaCl solution[4]. Consequently, at high concentrations of MV cation radical (which are all but required for economical operation of a RFB), a large proportion of the reactants will be present as dimers, with negative implications for negolyte solubility and viscosity.

Hydroxide ion, which is formed when MV cation radical comes into contact with dioxygen, causes the dealkylation (demethylation) of MV via a complex mechanism[5]. This demethylated product is insoluble when reduced and cannot be reversibly cycled. Because the decomposition reaction is second-order with respect to MV, this process proceeds far more rapidly at high concentrations of MV.

For a RFB employing a viologen as the negolyte, it is therefore desirable to develop a molecule that is much less susceptible to dimerization or dealkylation in order to preserve the long-term cycling capacity. Furthermore, this molecule must still be highly water-soluble, be derived from inexpensive reagents, and can be operated at neutral or near-neutral pH in order to realize the development of safer, more economical RFBs with high energy densities.

On the other side of the RFB, a posolyte species with similar characteristics (i.e. high stability and solubility, inexpensive, and usable at neutral or near-neutral pH) that cycles at a high reduction potential, should also be employed. Current posolyte species such as vanadium[6,7] (as $VO^{2+}/VO_2^+$) and bromine[2,10] (as $Br^-/Br_3^-$) have a high solubility in water but are, respectively, either too costly or too corrosive. Another popular choice for the posolyte is ferrocyanide, $[Fe(CN)_6]^{4-}/[Fe(CN)_6]^{3-}$, which is composed of earth-abundant elements. However, this compound, as its sodium or potassium salt, suffers from a low water solubility of 0.7 M at pH 7. The solubility is significantly lower at pH 14, an environment in which some RFBs operate.[3] (Ferrocyanide/ferricyanide decomposes below pH 7 to form toxic hydrogen cyanide and is therefore unsuitable for acidic RFBs.)[8] The solubility of ferricyanide/ferrocyanide at pH 7 may be increased further to 1.5 M (1.0 M at pH 14) by combining salts of sodium ferrocyanide and potassium ferrocyanide,[9] but is susceptible to precipitation when the ratio of ferrocyanide:ferricyanide changes, as will happen whenever it is cycled in a RFB. Another molecule that has been explored for use in RFBs is 4-hydroxy-2,2,6,6-tetramethylpiperidine-1-oxyl (4-HO-TEMPO). 4-HO-TEMPO is a persistent organic radical which has a reported water solubility of 2.1 M. Being an electrically neutral molecule, it requires a supporting electrolyte such as NaCl to provide sufficient ionic conductivity; in 1.5 M NaCl, the solubility drops to 0.5 M.

For both negolyte and posolyte, reactants that are derived from inexpensive reagents, safe, and can be operated at neutral or near-neutral pH are therefore of great importance to the development of safer, more economical RFBs with high energy densities.

SUMMARY OF THE INVENTION

The invention features redox flow batteries and compound useful therein as negolytes or posolytes. The batteries and compounds are advantageous in terms of being useable in water solutions at neutral pH and have extremely high capacity retention.

In one aspect, the invention features a redox flow battery including a first aqueous electrolyte including a first type of redox active material; and a second aqueous electrolyte including a second type of redox active material, wherein the first type of redox active material is a water-soluble diquaternized bipyridine. In particular embodiments, during discharge the water-soluble diquaternized bipyridine is oxidized.

An exemplary diquaternized bipyridine is of the formula:

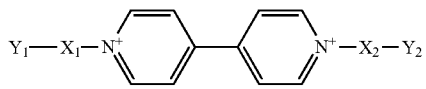

or a salt thereof,
wherein $X_1$ and $X_2$ are independently optionally substituted C1-20 hydrocarbyl or heteroalkylene, and $Y_1$ and $Y_2$ are independently an optionally substituted water solubilizing group, such as a quaternary ammonium, ammonium, nitrogen-containing heterocyclyl (e.g., tetrazolium, triazolium, imidazolium, pyridinium, or pyrazinium), sulfonate, or sulfate. In certain embodiments, $X_1$ and $X_2$ are independently C1-10 alkylene, e.g., C3-6 alkylene. Exemplary groups for $Y_1$ and $Y_2$ are quaternary ammonium independently substituted with three C1-6 hydrocarbyl groups, e.g., trimethyl ammonium. An exemplary diquaternized bipyridine is

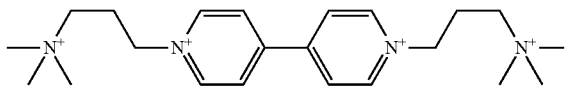

or a salt thereof.
In particular embodiments, the water-solubilizing group is charged at a pH between 6-8. Further embodiments of diquaternized bipyrimides have the above formula, except that the two pyridines are linked 2-2' instead of 4-4'.

In some embodiments, the first aqueous electrolyte and/or second aqueous electrolyte has a pH of 0-10, such as 4-10, 5-9, or 6-8. In further embodiments, the first aqueous electrolyte and/or second aqueous electrolyte does not include molecular oxygen, and the battery is sealed to prevent ingress of molecular oxygen. In further embodiments, the diquaternized bipyridine is present at a concentration of at least 0.1-10 M, e.g., 0.5 to 3 M. Suitable counterions for a diquaternized bipyridine include a halide, e.g., chloride or bromide.

In another aspect, the invention features a redox flow battery including a first aqueous electrolyte including a first type of redox active material; and a second aqueous electrolyte including a second type of redox active material, wherein the second type of redox active material is a water-soluble derivative of ferrocene. In certain embodiments, the water-soluble derivative of ferrocene is not (ferrocenylmethyl)trimethylammonium, e.g., as the chloride salt, or $N^1$-ferrocenylmethyl-$N^1,N^1,N^2,N^2,N^2$-pentamethyl-propane-1,2-diaminium, e.g., as the dibromide salt. In other embodiments, the first type of redox active material is not methyl viologen. In particular embodiments, during discharge the water-soluble derivative of ferrocene is reduced.

In some embodiments, the water-soluble derivative of ferrocene is of the formula:

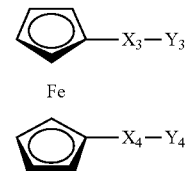

or a salt thereof,
wherein $X_3$ and $X_4$ are independent H or a C1-20 hydrocarbyl or heteroalkylene group and $Y_3$ and $Y_4$ are absent, when $X_3$ or $X_4$ is H or an optionally substituted water solubilizing group, such as a quaternary ammonium, ammonium, nitrogen-containing heterocyclyl (e.g., tetrazolium, triazolium, imidazolium, pyridinium, or pyrazinium), sulfonate, or sulfate, provided that at least one of $X_3$ and $X_4$ is not H. In certain embodiments, the formula excludes (ferrocenylmethyl)trimethylammonium, e.g., as the chloride salt, and $N^1$-ferrocenylmethyl-$N^1,N^1,N^2,N^2,N^2$-pentamethylpropane-1,2-diaminium, e.g., as the dibromide salt. In certain embodiments, at least one of $X_3$ and $X_4$, e.g., both, is C1-10 alkylene, e.g., C3-6 alkylene. Exemplary groups for $Y_3$ and $Y_4$ are quaternary ammonium independently substituted with three C1-6 hydrocarbyl groups, e.g., trimethyl ammonium. In further embodiments, neither $X_3$ nor $X_4$ is H. In other embodiments, at least one of $X_3$ and $X_4$, e.g., both, is heteroalkylene. Exemplary water-soluble ferrocene derivatives are

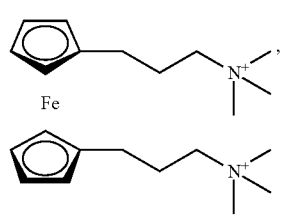

-continued

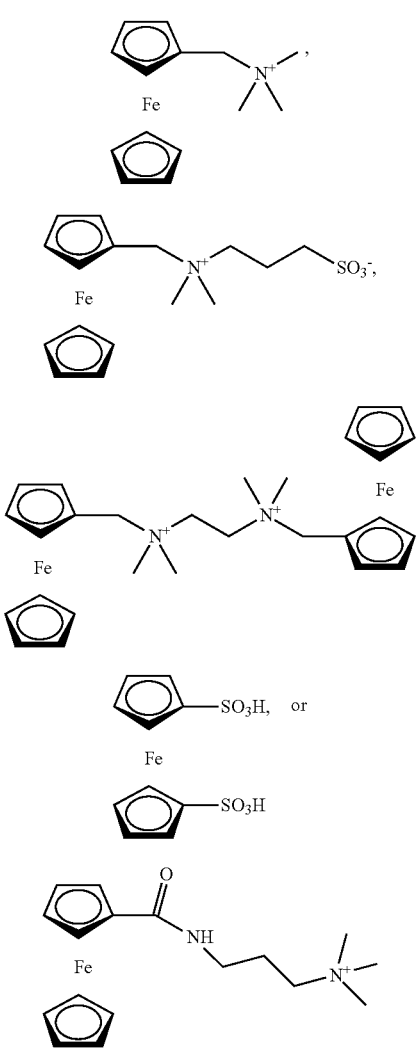

or a salt thereof.

In particular embodiments, the water-solubilizing group is charged at a pH between 6-8.

In some embodiments, the first aqueous electrolyte and/or second aqueous electrolyte has a pH of 0-10, such as 4-10, 5-9, or 6-8. In further embodiments, the first aqueous electrolyte and/or second aqueous electrolyte does not include molecular oxygen, and the battery is sealed to prevent ingress of molecular oxygen. In further embodiments, the water-soluble ferrocene derivative is present at a concentration of at least 0.1-10 M, e.g., 0.5 to 3 M. Suitable counterions for a water-soluble ferrocene derivative include a halide, e.g., chloride or bromide, or $BF_4^-$.

In a further aspect, the invention provides a redox flow battery where the first type of redox active material is the quaternized bipyridine as described above and the second type of redox active material is the water-soluble ferrocene derivative as described above.

In another aspect, the invention features a diquaternized bipyridine substituted with one or more water-solubilizing groups, provided that the diquaternized bipyridine is not compound 1. Such diquaternized bipyridines are as described above for use as a first type of redox active material.

In another aspect, the invention features a ferrocene molecule substituted with one or more water-solubilizing groups. Such ferrocene molecules are as described above for use as a second type of redox active material.

By alkyl is meant straight chain or branched saturated groups from 1 to 20 carbons. Alkyl groups are exemplified by methyl, ethyl, n- and iso-propyl, n-, sec-, iso- and tert-butyl, neopentyl, and the like.

By alkylene is meant a divalent alkyl group.

By heteroalkylene is meant an alkylene group in which one or more $CH_2$ units are replaced with one or more heteroatoms selected from O, N, and S. Heteroalkylene can be substituted by oxo (=O). An exemplary heteroalkylene includes an amido group, e.g., —$(CH_2)$nC(O)NH$(CH_2)$m-, wherein n and m are independently 1-6.

By heterocyclyl is meant a cyclic group including 1 to 9 carbon atoms and 1 to 4 heteroatoms selected from O, N, and S in the ring. Heterocyclyl groups, especially at N atoms, may be substituted by hydrocarbyl, e.g., alkyl, such as methyl. Examples include tetrazolium, triazolium, imidazolium, pyridinium, and pyrazinium.

By hydrocarbyl is meant a branched, unbranched, cyclic, or acyclic group including the elements C and H. Hydrocarbyl groups may be monovalent, e.g., alkyl, or divalent, e.g., alkylene. Hydrocarbyl groups may be substituted with groups including oxo (=O). Hydrocarbyl may also be substituted by ferrocenyl, e.g., as in compound 5.

DETAILED DESCRIPTION

Figure 1:
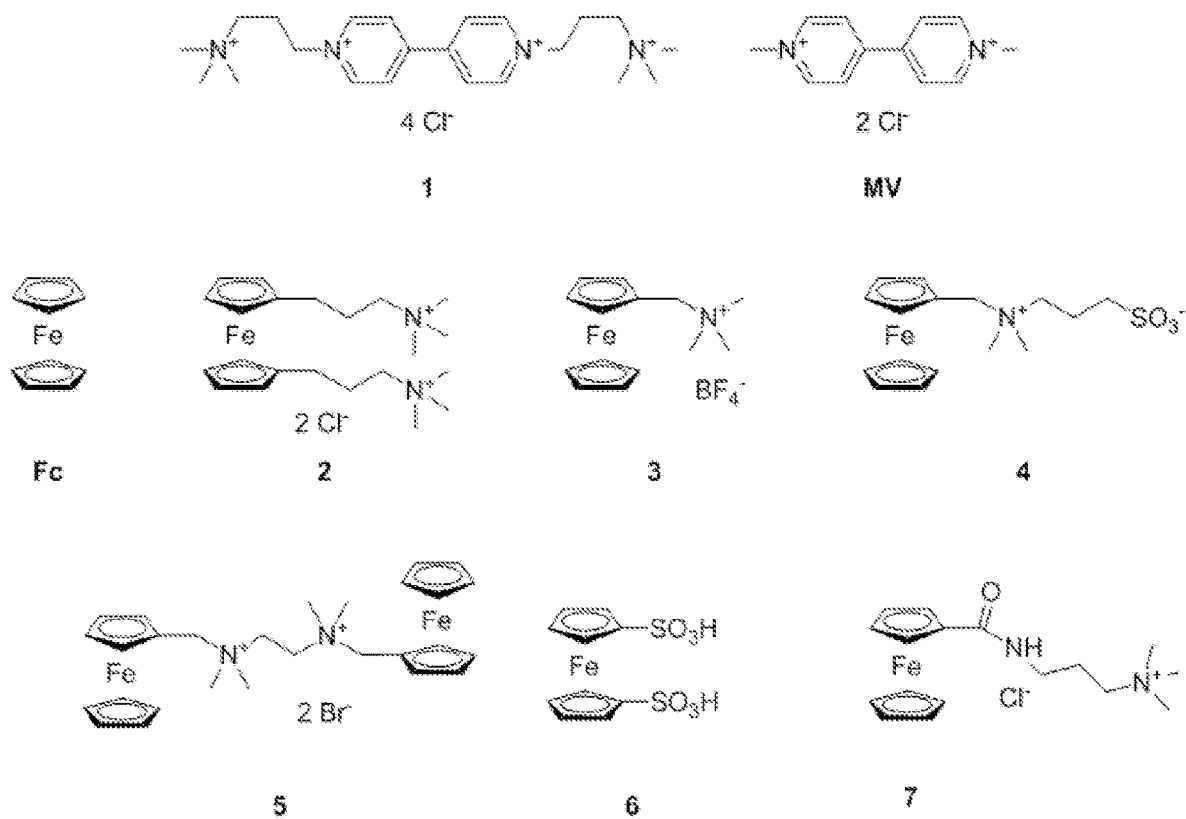
FIG. 1. Chemical structure of (3-trimethylammonio)propyl viologen tetrachloride (1), methyl viologen (MV), bis((3-trimethylammonio)propyl)ferrocene dichloride (2), other ferrocene derivatives (3-6), and 2,3-bis(trimethylammoniomethyl)-9,10-anthraquinone dibromide (7).

We disclose classes of compounds, all functionalized with similar chemical functionalities, that possess significant advantages over their unfunctionalized counterparts. In particular, the compounds provide RFBs with extremely high capacity retention. For example, RFBs of the invention can be cycled for 1000 times with on 1% loss of capacity, and such batteries could be employed for years of service. Both negolyte and posolyte compounds are disclosed. The negolyte compounds are derivatives of diquaternized bipyridine, and the posolyte compounds are water-soluble ferrocene derivatives.

The aforementioned chemical functionality includes one or more solubilizing groups that are normally ionized in water solution. Key properties of this class of negolyte and posolyte molecules, so functionalized, include, but are not limited to, the following:

Composed only of earth-abundant elements

Undergoes a rapid, reversible one-electron reduction or oxidation at a carbon electrode without the need for any electrocatalyst Low reduction potential that is lower than +0.1 V vs. a reversible hydrogen electrode (RHE) at operating pH (for negolyte species) or a high reduction potential that is greater than +0.8 V vs. a RHE at operating pH (for posolyte species)

High chemical stability in both oxidized and singly reduced forms to water, over a wide range of pH values including neutral (pH 7)

High solubility in water

Low crossover rate across ion exchange membranes that have the same overall sign of fixed charge Allow RFB operation without any supporting electrolyte Exemplary diquaternized bipyridine are of the formula:

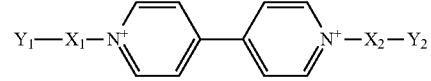

or a salt thereof,
wherein $X_1$ and $X_2$ are independently optionally substituted C1-20 hydrocarbyl (e.g., C1-10 alkylene) or heteroalkylene, and $Y_1$ and $Y_2$ are independently an optionally substituted water solubilizing group, e.g., a quaternary ammonium (e.g., trimethyl ammonium), ammonium, nitrogen-containing heterocyclyl, sulfonate, or sulfate. An exemplary diquaternized bipyridine is compound 1.

Exemplary water-soluble derivatives of ferrocene are of the formula:

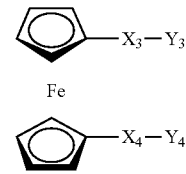

or a salt thereof,
wherein $X_3$ and $X_4$ are independent H or a C1-20 hydrocarbyl (e.g., C1-10 alkylene) or heteroalkylene group and $Y_3$ and $Y_4$ are absent, when $X_3$ or $X_4$ is H or an optionally substituted water solubilizing group, e.g., a quaternary ammonium (e.g., trimethyl ammonium), ammonium, nitrogen-containing heterocyclyl, sulfonate, or sulfate provided that at least one of $X_3$ and $X_4$ is not H. Exemplary water-soluble derivatives of ferrocene are compounds 2-7.

In certain embodiments, a battery of the invention includes a diquaternized bipyridine as the negolyte. In other embodiments, a battery includes a water-soluble ferrocene derivative as the posolyte. In still further embodiments, battery of the invention includes a diquaternized bipyridine as the negolyte and a water-soluble ferrocene derivative as the posolyte. Suitable cells, electrodes, membranes, and pumps for redox flow batteries are known in the art, e.g., WO 2014/052682, WO 2015/048550, and WO 2016/144909, the battery components of which are hereby incorporated by reference.

For batteries with a diquaternized bipyridine as the negolyte, a preferred posolyte is a water-soluble ferrocene derivative of the invention. Other posolytes that may or may not be employed include 4-hydroxy-TEMPO, TEMPO polymer, and TEMPTMA. For batteries with a water-soluble ferrocene derivative as the posolyte, a preferred negolyte is a diquaternized bipyridine of the invention. Another negolyte that may or may not be employed is methyl viologen. Still further redox active species that may be used in a battery of the invention are bromine, chlorine, iodine, oxygen, vanadium, chromium, cobalt, iron, e.g., ferricyanide/ferrocyanide, aluminum, e.g., aluminum(III) biscitrate monocatecholate, manganese, cobalt, nickel, copper, or lead, e.g., a manganese oxide, a cobalt oxide, or a lead oxide. Other redox active species suitable for use in batteries of the invention are described in WO 2014/052682, WO 2015/048550, and WO 2016/144909, the redox active species of which are incorporated by reference.

One embodiment of the invention (1), intended for use as a negolyte species, is shown in FIG. 1. Compound 1 is a viologen, a previously reported[10] derivative of 4,4'-bipyridyl that has been functionalized with two quaternary ammonium groups that impart a very high water solubility of 2.0 M at 25° C. (See Example 1 for the chemical synthesis of 1.)

Figure 2:
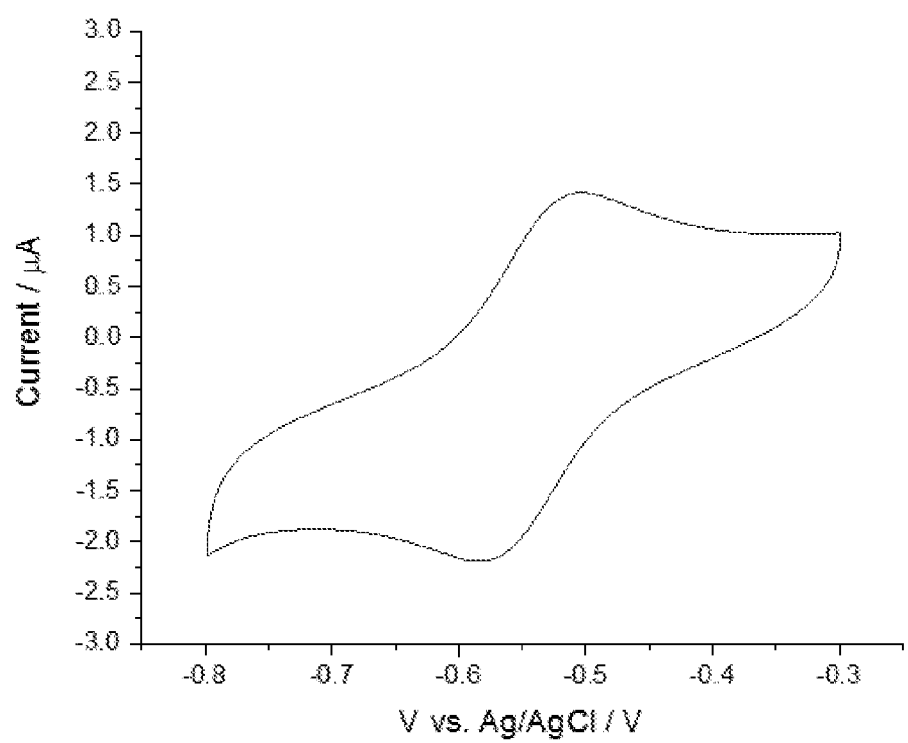
FIG. 2. Cyclic voltammogram of 1 in a pH 7.00 phosphate buffer. Conditions: 10 mV/s, $10^{th}$ cycle.

1 is composed only of earth-abundant elements and undergoes reversible electron transfer at a low reduction potential of −0.55 V vs. a Ag/AgCl reference electrode at pH 7 (i.e. +0.07 V vs. RHE), as determined by cyclic voltammetry. (FIG. 2)

For a compound with such a large molecular weight (500.37 g/mol), the solubility of 1 in pH 7.0 water is extremely high. 10.0 grams of 1 can dissolve in less than 1.0 mL of water to give a 2.0 M solution. The high solubility of 1 is not impacted by having to use a supporting electrolyte that may ultimately lower its actual solubility under operating conditions in a RFB.

Each molecule of 1 has four positive charges on it (three when reduced). The added charges on 1 (compared to MV) greatly decrease the extent of radical dimerization or the rate of hydroxide-mediated dealkylation, by way of greatly increased Coulombic repulsion between two molecules of 1 or its singly reduced state. Moreover, the extra two positive charges on the molecule will allow 1 to enjoy very low crossover rates across anion exchange membranes compared to MV due to increased size and charge exclusion of the molecule from the similarly charged membrane surface.

Another embodiment of the invention (2) is also shown in FIG. 1. Ferrocene (Fc) is only slightly soluble in water, but 2 is a ferrocene derivative that has been functionalized with two quaternary ammonium groups that impart a very high water solubility of 1.9 M at 25° C. In comparison, the related derivative 3, which has only one quaternary ammonium group, has a solubility in water of ~0.4 M at 25° C., whereas the zwitterionic species 4 has a solubility of ~0.2 M. Both compounds 3 and 4 have a reduction potential of +0.43 V vs. Ag/AgCl at pH 7 (+1.05 V vs. RHE). (See Example 2 for the chemical synthesis of 2.)

Figure 3:
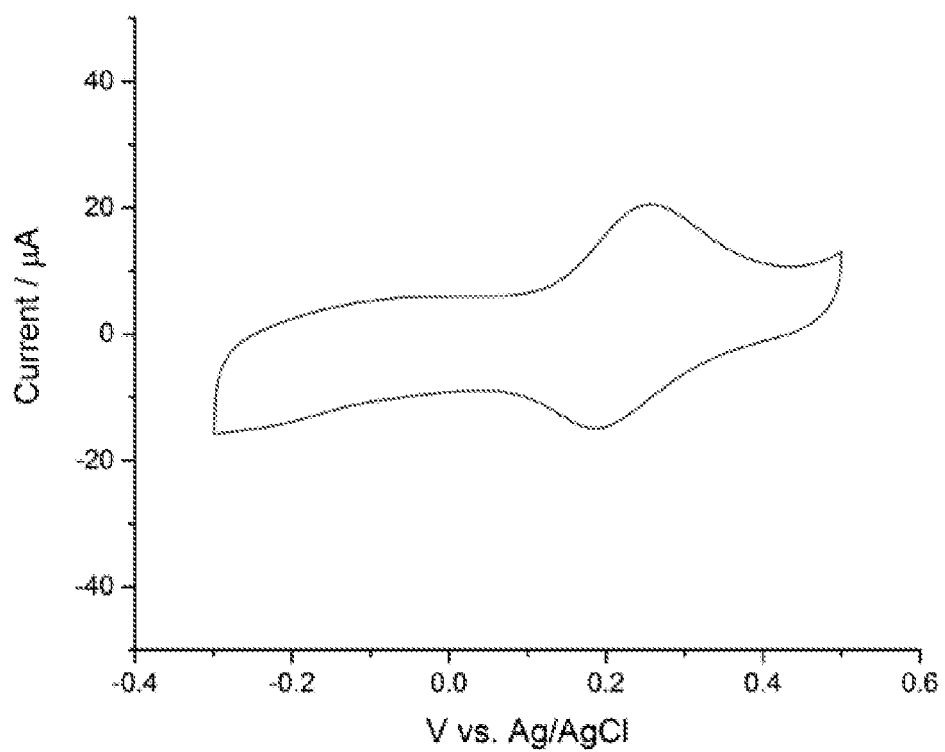
FIG. 3. Cyclic voltammogram of 2 in a pH 7.00 phosphate buffer. Conditions: 10 mV/s, $10^{th}$ cycle.
Figure 4:
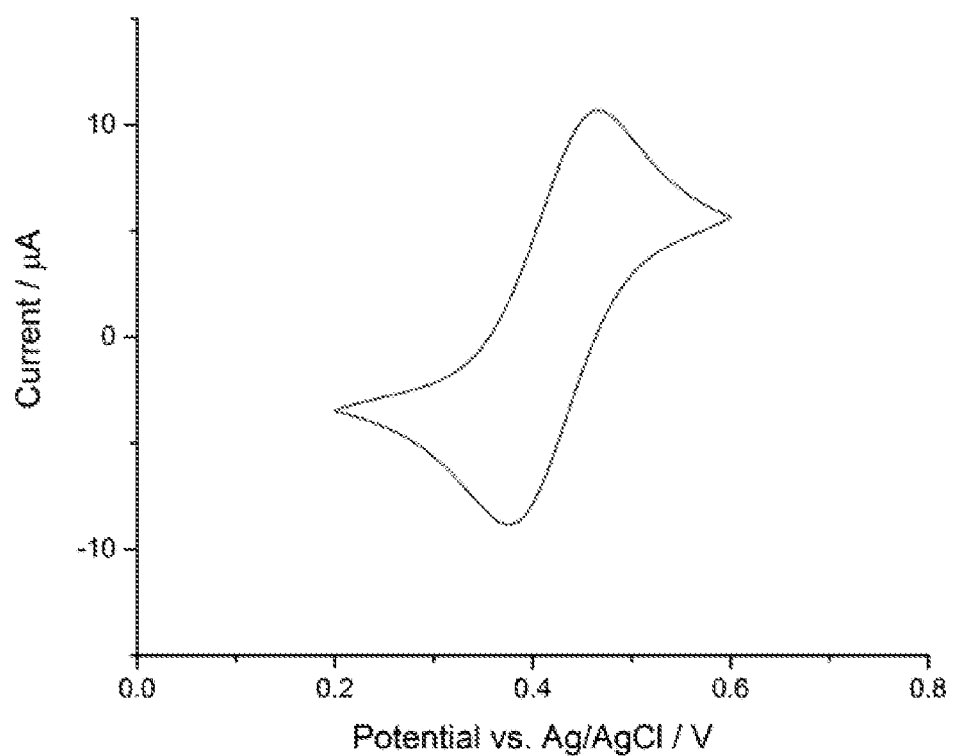
FIG. 4. Cyclic voltammogram of 3 in a pH 7.00 phosphate buffer. Conditions: 10 mV/s, $10^{th}$ cycle.
Figure 5:
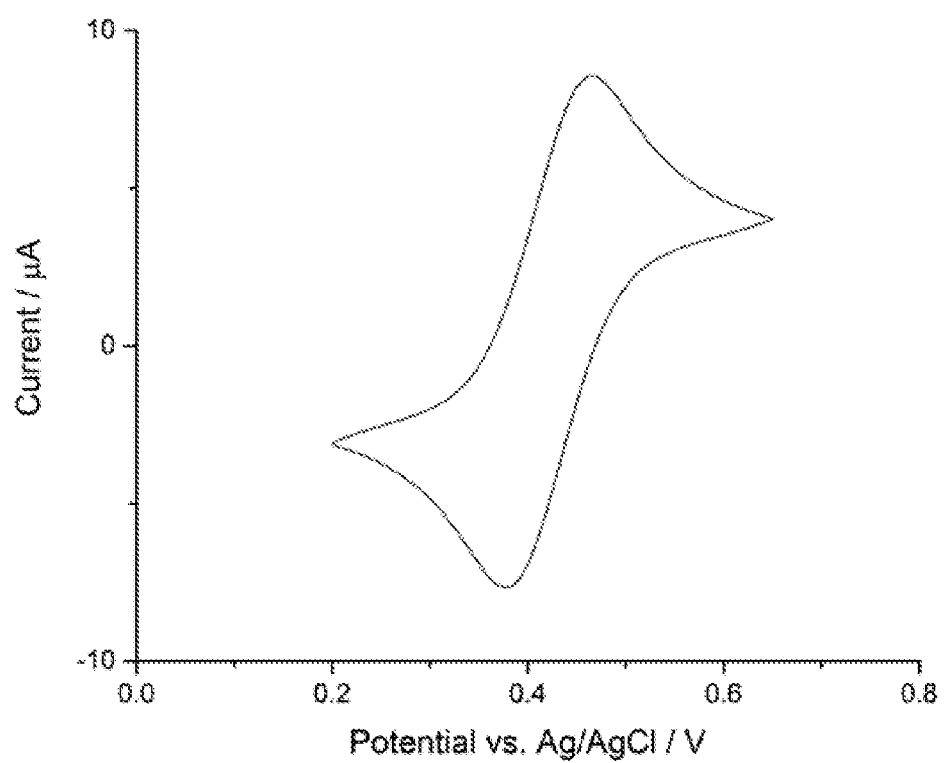
FIG. 5. Cyclic voltammogram of 4 in a pH 7.00 phosphate buffer. Conditions: 10 mV/s, $10^{th}$ cycle.
Figure 6:
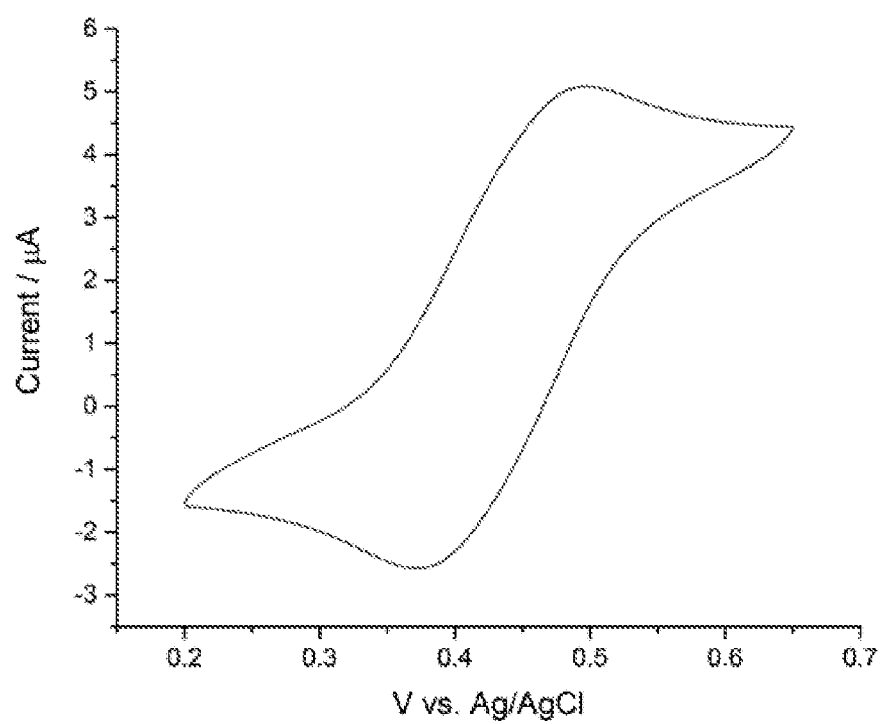
FIG. 6. Cyclic voltammogram of 5 in a pH 7.00 phosphate buffer. Conditions: 10 mV/s, $10^{th}$ cycle.
Figure 7:
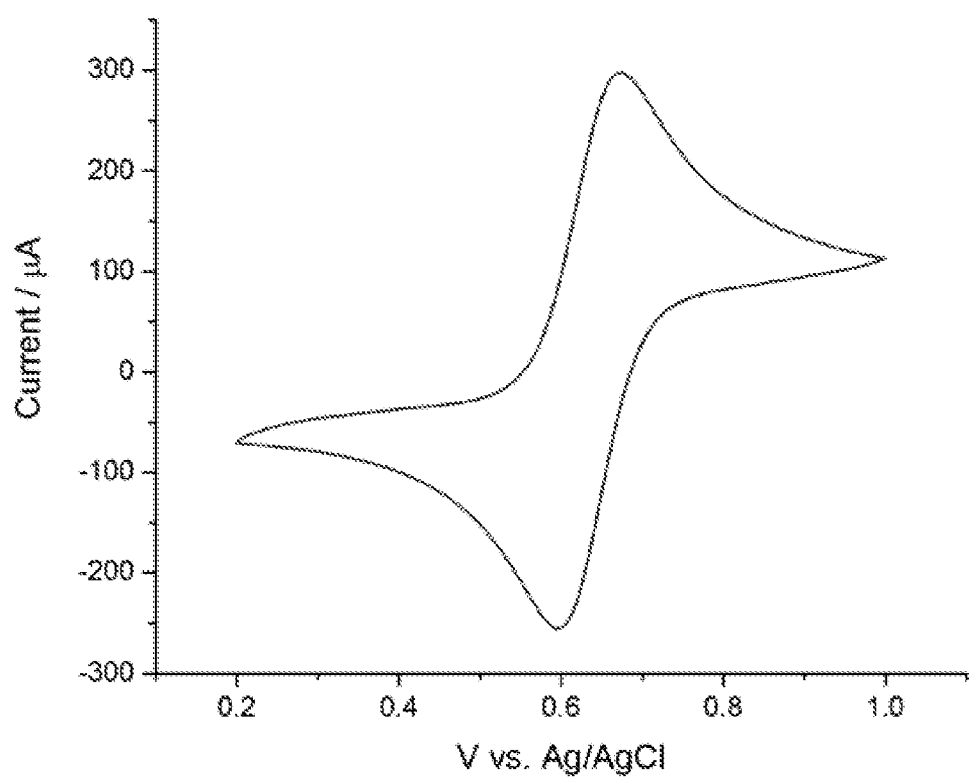
FIG. 7. Cyclic voltammogram of 6 in 1 M $H_2SO_4$. Conditions: 10 mV/s, $10^{th}$ cycle.

Furthermore, 2 is composed only of earth-abundant elements and undergoes reversible electron transfer at a high reduction potential of +0.21 V vs. an Ag/AgCl reference electrode at pH 7 (i.e. +0.83 V vs. RHE), as determined by cyclic voltammetry. (FIG. 3) The compound was found to cycle stably within a pH range of 0-10. Preliminary cell cycling data from a RFB using compound 1 as the negolyte and compound 2 as the posolyte is presented in Example 7 and FIG. 8.

For a compound that undergoes reversible redox at a high potential, the solubility of 2 in pH 7.0 water is unexpectedly high, nearly three times that of potassium ferrocyanide. Moreover, the high solubility of 2 is not impacted by having to use a supporting electrolyte that may ultimately lower its actual solubility under operating conditions in a RFB. This stands in contrast to 4-HO-TEMPO, which requires a supporting electrolyte such as NaCl to provide solution conductivity.

Each molecule of 2 has two positive charges on it (three when oxidized). The charges allow 2 to enjoy very low crossover rates across anion exchange membranes due to charge exclusion of the molecule from the charged membrane surface. For example, we have measured the crossover rate of 2 across a Selemion AMV membrane to be roughly $1 \times 10^{-11}$ cm$^2$/s, which corresponds to a period on the order of a hundred years before posolyte crossing over to the negative electrolyte (the negolyte) results in a 10% loss of RFB capacity, using reasonable assumptions for the operating characteristics of the battery. Similar or better performance for 1 has not been measured but is expected on account of its greater overall charge compared to 1 (+4 instead of +2).

Another embodiment of the invention is 5, a posolyte compound that has more than one ferrocene center. Compounds with more than one redox-active center can store more charge per mole, while their increased size relative to other compounds with only one redox center will result in lower rates of crossover across a similarly charged membrane. 5 has a reduction potential of +0.44 V vs. Ag/AgCl at pH 7 (+1.06 V vs. RHE) and a solubility of 0.1 M in water at room temperature.

An additional embodiment of the invention is 6[11], a posolyte compound having two negatively charged groups, instead of positively charged groups, which impart water solubility. In a 1 M solution of aqueous H$_2$SO$_4$, the compound has a reduction potential of +0.85 V vs. the standard hydrogen electrode (SHE) and has a solubility of ~1 M in water at room temperature.

General Information for Syntheses:

All reagents were purchased from Sigma-Aldrich, Alfa Aesar, or Oakwood Chemical and used as received unless otherwise stated. All reactions sensitive to moisture or oxygen were carried out in oven dried or flame dried and nitrogen-charged glassware. All anhydrous solvents were saturated with argon and passed through a column of activated alumina immediately prior to use.

$^1$H NMR and $^{13}$C NMR spectra were recorded on Varian INOVA 500 spectrometers at 500 MHz. NMR spectra were recorded in solutions of deuterated chloroform (CDCl$_3$) with the residual chloroform (7.24 ppm for $^1$H NMR and 77.1 ppm for $^{13}$C NMR) taken as the internal standard, or dimethyl sulfoxide-d$_6$ (DMSO-d$_6$) with residual DMSO-d$_5$ (2.49 ppm for $^1$H NMR and 39.52 ppm for $^{13}$C NMR) taken as the internal standard, or deuterium oxide (D$_2$O) with residual HDO (4.8 ppm for $^1$H NMR) taken as the internal standard, and were reported in parts per million (ppm). Abbreviations for signal coupling are as follows: s, singlet; bs, broad singlet; d, doublet; t, triplet; q, quartet; dd, doublet of doublet; ddd, doublet of doublet of doublet; dt, doublet of triplet; m, multiplet.

Example 1. Synthesis of Compound 1

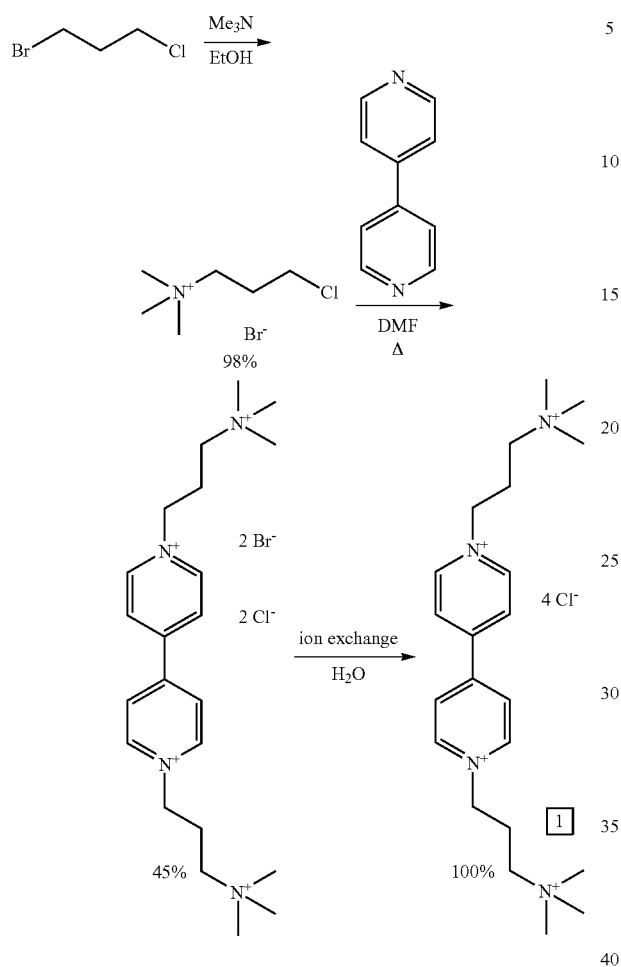

99.19 g (630.0 mmol) of 1-bromo-3-chloropropane was stirred with 50.0 mL (210.0 mmol) of a 4.2 M solution of trimethylamine in ethanol. After stirring at room temperature for 15 hours, the reaction mixture was diluted with ~500 mL of methyl tert-butyl ether (MBTE), and the suspended solid collected by vacuum filtration. The solid was rinsed with MBTE and dried in vacuo to give trimethyl(3-chloropropyl)ammonium bromide (3). Yield: 44.75 g (98.4%) of a fine white powder. This material was used without purification in the following step.

44.75 g of 3 and 15.6180 g (100.00) mmol of 4,4'-bipyridyl were suspended in ~100 mL of anhydrous DMF and heated to reflux under argon. Upon heating, all solids dissolved, followed shortly after by the formation of a large amount of pale yellow precipitate. After heating for 1 hour, the reaction mixture had partially solidified and had turned slightly greenish. The reaction was cooled to room temperature, whereupon ~500 mL of isopropanol was added, and the solid material was triturated until no trace of green coloration remained. The solid was collected by vacuum filtration, rinsed with isopropanol, then acetone, then finally dried in vacuo to give (3-trimethylammonio)propyl viologen dichloride dibromide (4). Yield: 26.2701 g (44.6%) of a pale yellow powder.

$^1$H NMR (500 MHz, CDCl$_3$) δ 9.12 (d, 4H), 8.63 (d, 4H), 4.87 (t, 4H), 3.61 (m, 4H), 3.22 (s, 18H), 2.72 (m, 4H).

A solution of 11.48 g (19.48 mmol) of 4 in ~100 mL of deionized H$_2$O was passed through ~0.5 kg of wet Amberlite IRA-900 resin (chloride form). The resin was washed with ~1 L of deionized H$_2$O, and the filtrate evaporated in vacuo to give pure (3-trimethylammonio)propyl viologen tetrachloride (1). Yield: 9.76 g (99.9%) of a pale yellow deliquescent solid.

Example 2. Synthesis of Compound 2

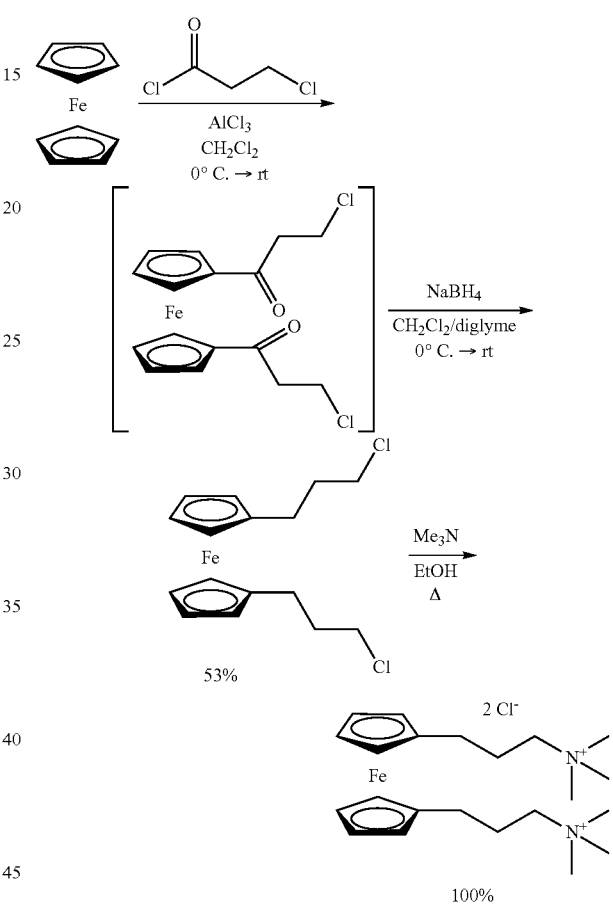

14.67 g (110.0 mmol) of AlCl$_3$ was suspended in ~100 mL of anhydrous CH$_2$Cl2. A solution of 12.70 g (100.0 mmol) of 3-chloropropionyl chloride in ~50 mL of anhydrous CH$_2$Cl2 was added by syringe and the mixture stirred at room temperature for 2 hours. Once this was complete, the resulting slightly turbid golden-yellow solution was transferred via cannula into another flask, which had been cooled to 0° C., containing a solution of 9.30 g (50.0 mmol) of ferrocene in ~100 mL of anhydrous CH$_2$Cl2. After stirring overnight, the reaction mixture was again cooled to 0° C. and a solution of 200 mL of 0.5 M NaBH$_4$ (100.0 mmol) in anhydrous diglyme was added via cannula and stirring was continued for a further 4 hours. Following that, the reaction was carefully quenched by the addition of ~500 mL of 1 M aqueous HCl. The organic phase was isolated and the aqueous phase extracted with CH$_2$Cl2 (3×100 mL). The extracts were combined, dried over anhydrous Na$_2$SO$_4$, filtered and evaporated to give the crude product of 1,1'-bis(3-chloropropyl)ferrocene as a red-brown oil. An analytically pure sample can be obtained by employing silica gel column chromatography (0→25% $CH_2Cl_2$/hexane). Yield: 8.93 g (52.7%) of a yellow-brown oil.

$^1$H NMR (500 MHz, $CDCl_3$) δ 4.10 (bs, 8H), 3.53 (bs, 4H), 2.40 (bs, 4H), 1.94 (bs, 4H); $^{13}$C NMR (125 MHz, $CDCl_3$) δ 110.1, 70.0, 69.3, 44.7, 33.9, 26.6.

8.93 g (26.3 mmol) 1,1'-bis(3-chloropropyl)ferrocene was dissolved in ~100 mL of a 4.2 M solution of trimethylamine in ethanol. The solution was sealed in a heavy-walled glass tube and heated to 60° C. for 5 days. Following that, all volatiles were removed in vacuo to give pure 2. Yield: 12.04 g (100.0%) of an orange-yellow powder.

If this step is performed with crude 1,1'-bis(3-chloropropyl)ferrocene, purification is achieved by dissolving crude 2 in a small volume of water and filtering off the excess, unreacted material.

$^1$H NMR (500 MHz, $D_2O$) δ 4.15 (d, 8H), 3.27 (m, 4H), 2.55 (t, 4H), 1.94 (m, 4H); $^{13}$C NMR (125 MHz, $CDCl_3$) δ 110.0, 87.1, 69.0, 68.4, 66.1, 52.7, 52.7, 52.6, 25.2, 24.0.

Example 3. Synthesis of Compound 3

0.4863 g (2.00 mmol) of (dimethylamino)methylferrocene was dissolved in ~10 mL of anhydrous $CH_2Cl_2$. 0.2958 g (2.00 mmol) of trimethyloxonium tetrafluoroborate was added as a solid and the reaction stirred at room temperature for 2 hours. Thereafter, the reaction mixture was diluted with ~50 mL of methyl tert-butyl ether (MTBE) and allowed to stand for 15 minutes. The precipitate was filtered off, rinsed with MTBE, then hexane, then dried in vacuo. Yield: 0.5710 g (82.8%) of an orange-yellow powder.

Example 4. Synthesis of Compound 4

25.00 g (102.8 mmol) of (dimethylamino)methylferrocene and 13.82 g (113.1 mmol) of 1,3-propanesultone were stirred together in ~500 mL of ethyl acetate. After 19 hours, the reaction mixture was filtered, and the collected solid was rinsed with ethyl acetate, acetone, then MTBE. Prolonged drying in vacuo at 50° C. gave the pure product. Yield: 37.55 g (100.0%) of an orange-yellow powder.

$^1$H NMR (500 MHz, DMSO-$d_6$) δ 4.51 (m, 2H), 4.37 (m, 4H), 4.23 (s, 5H), 3.25 (m, 2H), 2.82 (s, 6H), 2.43 (t, 2H), 2.02 (m, 2H).

Example 5. Synthesis of Compound 5

0.5349 g (2.20 mmol) of (dimethylamino)methylferrocene and 0.1879 g (1.00 mmol) of 1,2-dibromoethane were refluxed together in ~10 mL of isopropanol for 22 hours. After that, the reaction mixture was diluted with ~100 mL of diethyl ether. The precipitate was filtered and rinsed with diethyl ether, then hexane. The crude product was suspended in ~100 mL of chloroform and filtered twice, after which the filtrate was concentrated and the resulting solid recrystallized from chloroform/ethanol. Yield: 0.5965 g (88.5%) of an orange-yellow powder.

$^1$H NMR (500 MHz, DMSO-$d_6$) δ 4.53 (t, 4H), 4.39 (t, 4H), 4.31 (s, 4H), 4.24 (s, 10H), 3.31 (s, 10H), 2.64 (s, 6H).

Example 6. Use of Compounds 1 and 2 in a Flow Battery

Figure 8:
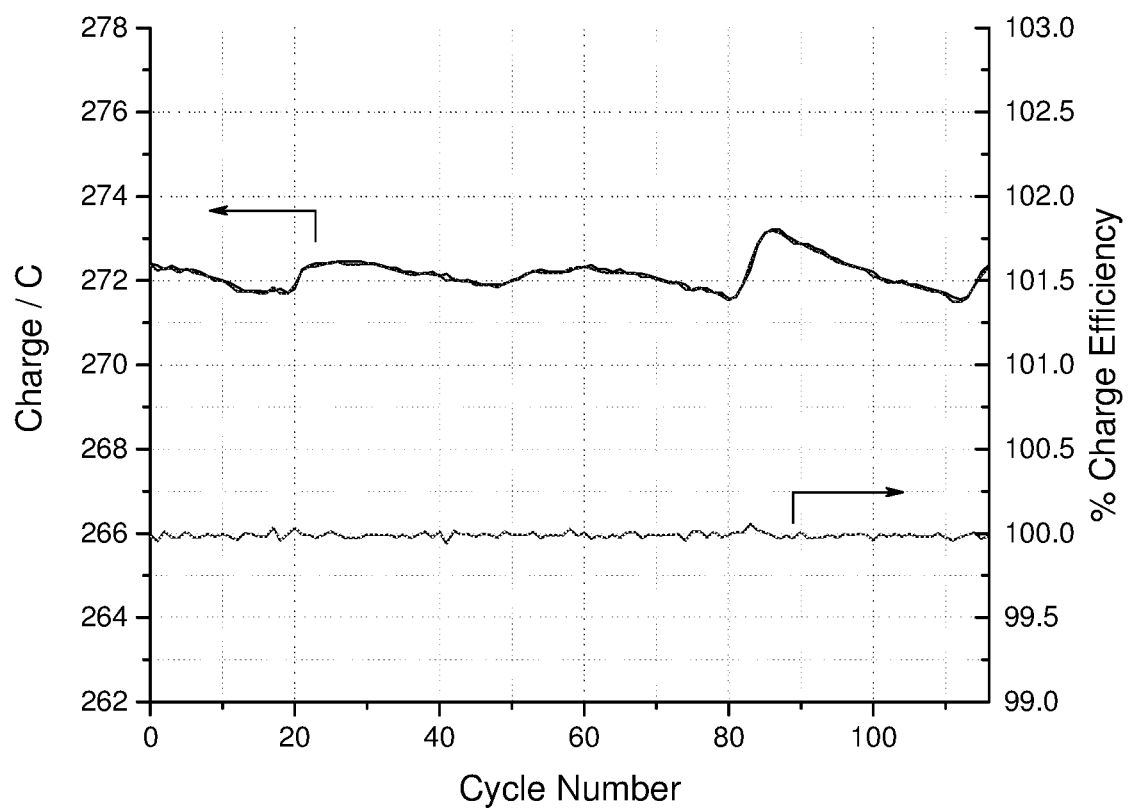
FIG. 8. Evolution of RFB charge capacity (black trace, left axis), RFB discharge capacity (left axis) and current efficiency (right axis) over 116 cycles at a constant charging/discharging current density of 40 mA/cm$^2$. Conditions: 0.5 M 1 negolyte (14.5 mL), 1.0 M 2 posolyte (5.5 mL), pH 7.0, nitrogen atmosphere, 3× prebaked SGL 39AA carbon paper electrodes on each side, serpentine flow fields on sealed graphite plates, 5 cm$^2$ Selemion AMV membrane (presoaked in 0.5 M NaCl), Viton gaskets, peristaltic pump speed 60 mL/min, room temperature.
Figure 9:
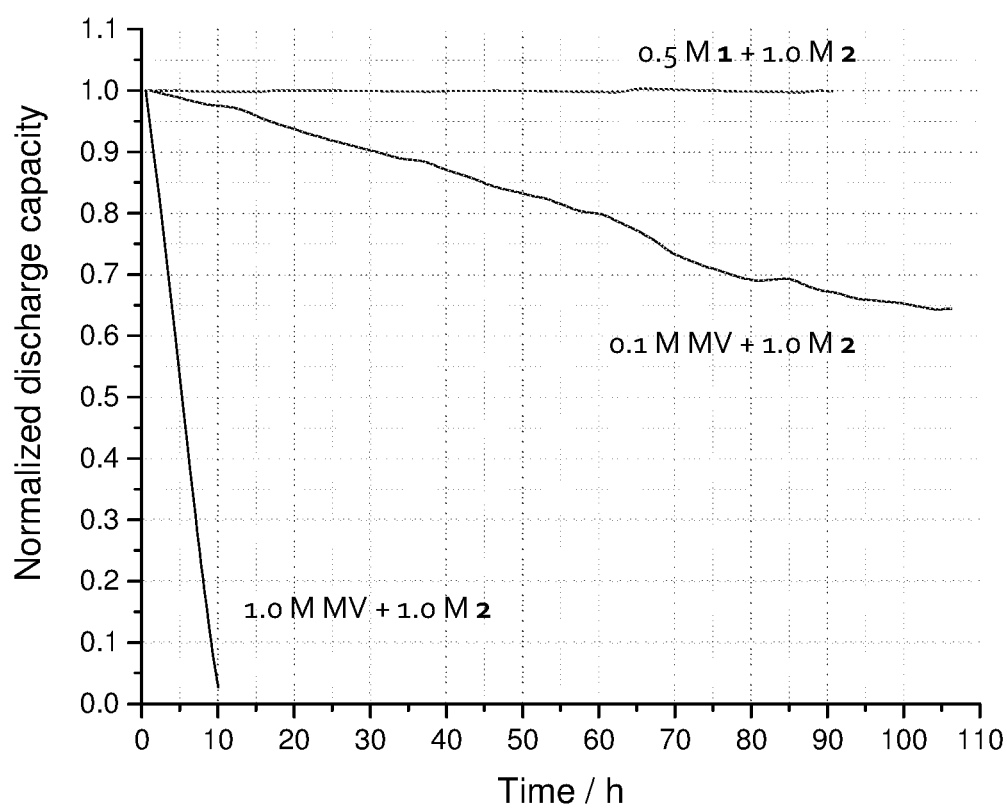
FIG. 9. Comparison of normalized RFB discharge capacity as a function of time at a constant charging/discharging current density of 40 mA/cm$^2$ for different negolyte compositions. All electrolytes were dissolved in 18.2 MΩ·cm deionized water. Electrolyte volumes: 14.5 mL of 0.5 M 1 and 5.5 mL of 1.0 M 2 (top trace); 100.0 mL of 0.1 M MV and 5.0 mL of 1.0 M 2 (middle trace); 10.0 mL of 1.0 M MV and 5.0 mL of 1.0 M 2 (bottom trace). Conditions: pH 7.0, nitrogen or argon atmosphere, 3 or 4× prebaked SGL 39AA carbon paper electrodes on each side, serpentine flow fields on sealed graphite plates, 5 cm² Selemion AMV membrane (presoaked in 0.5 M NaCl), Viton gaskets, peristaltic pump speed 60 mL/min, room temperature.

To demonstrate the use of 1 and 2 inside a working RFB, a 1.3-fold excess of 1 (0.5 M, 14.5 mL) as the negolyte was paired against 2 as a posolyte (1.0 M, 5.5 mL) at pH 7 in a small-scale RFB equipped with a membrane of Selemion AMV. The electrolytes were unbuffered. When this RFB was cycled at a constant current of 40 mA/cm$^2$ with respect to the membrane, a capacity retention of 99.99982%/cycle at a current efficiency of 99.99% was observed over 116 cycles. (FIG. 8). FIG. 9 shows a comparison of normalized RFB discharge capacity as a function of time at a constant charging/discharging current density of 40 mA/cm$^2$ for different negolyte compositions.

Example 7. Further Use of Compounds 1 and 2 in a Flow Battery

Figure 10:
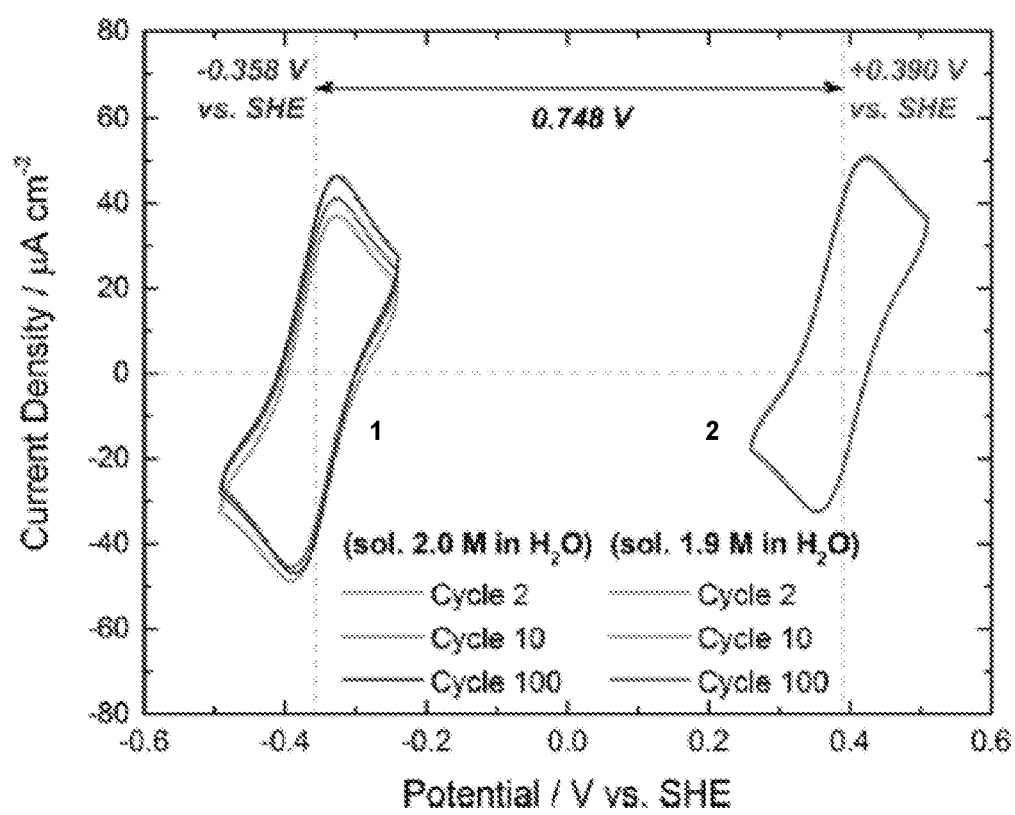
FIG. 10. Cyclic voltammograms of 1 (left trace) and 2 (right trace). The water solubilities and reduction potentials of both molecules vs the standard hydrogen electrode (SHE) are indicated. Note that as 1 is cycled, the solution near the working electrode is gradually depleted of dissolved oxygen. Conditions: 1.0 mM in 0.5 M NaCl, 10 mV s-1 sweep rate. The 2nd, 10th, and 100th cycles are superimposed.
Figure 11A:
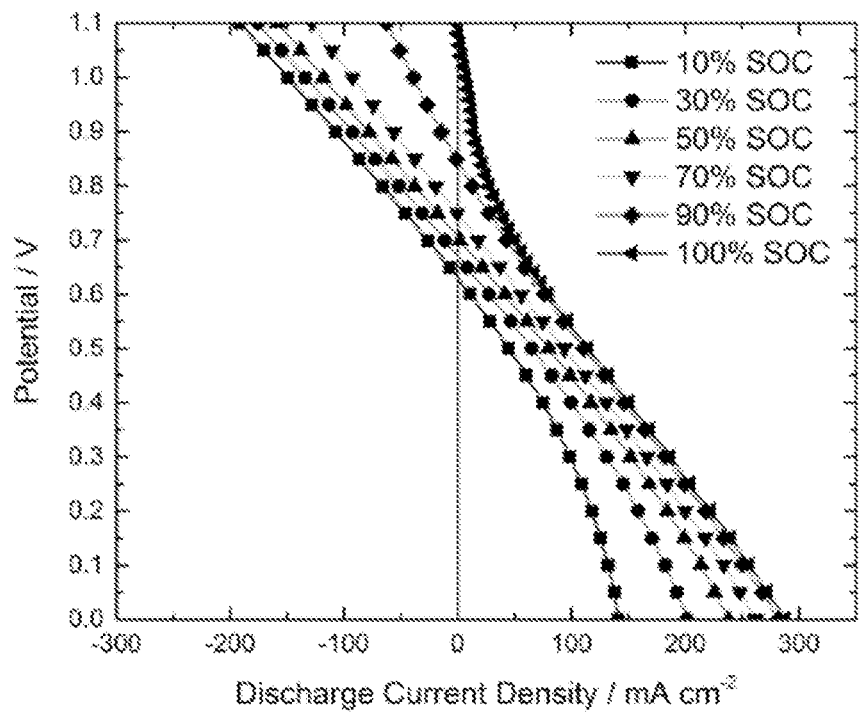
FIG. 11. (a) Cell voltage vs discharge current density at 20° C., at 10%, 30%, 50%, 70%, 90%, and ~100% SOC. Electrolytes comprise 6.00 mL of 1.3 M 1 (negolyte) and 6.00 mL of 1.3 M 2 (posolyte). (b) Measured cell OCV, high-frequency ASR, and polarization ASR vs SOC. (c) Representative galvanostatic charge and discharge curves from 25 mA cm$^{-2}$ to 150 mA cm$^{-2}$, in increments of 25 mA cm$^{-2}$. The vertical dashed lines indicate the maximum volumetric capacity realized with potentiostatic charging and discharging at the indicated voltage cutoffs ("potentiostatic capacity"), as well as the theoretical volumetric capacity. (d) Coulombic efficiency, voltage efficiency, and round-trip energy efficiency, as well as capacity utilization as a percentage of theoretical capacity for cell operation at different current densities.
Figure 11B:
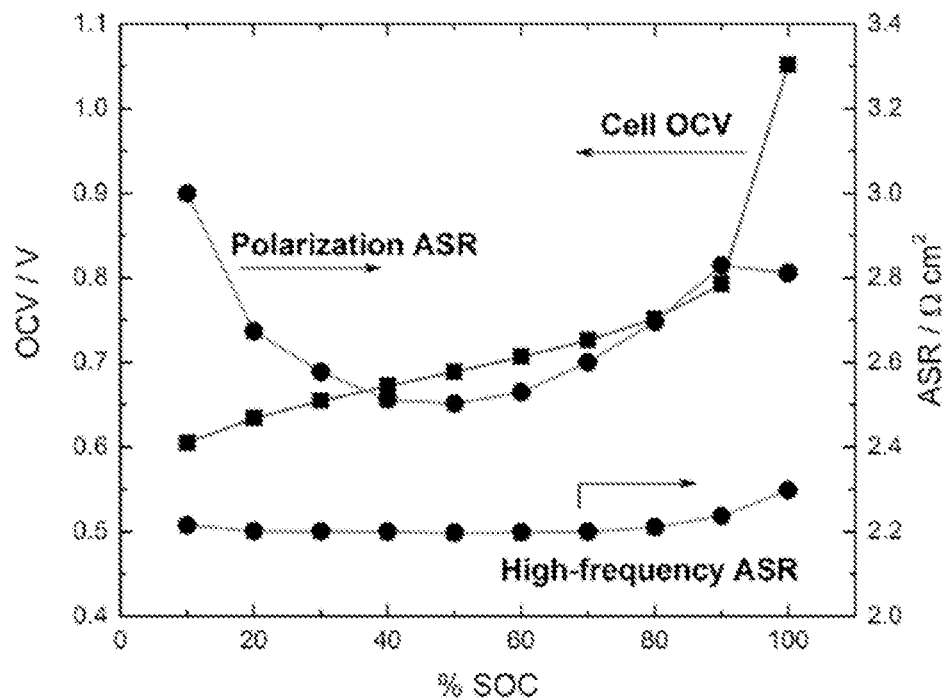
Figure 11C:
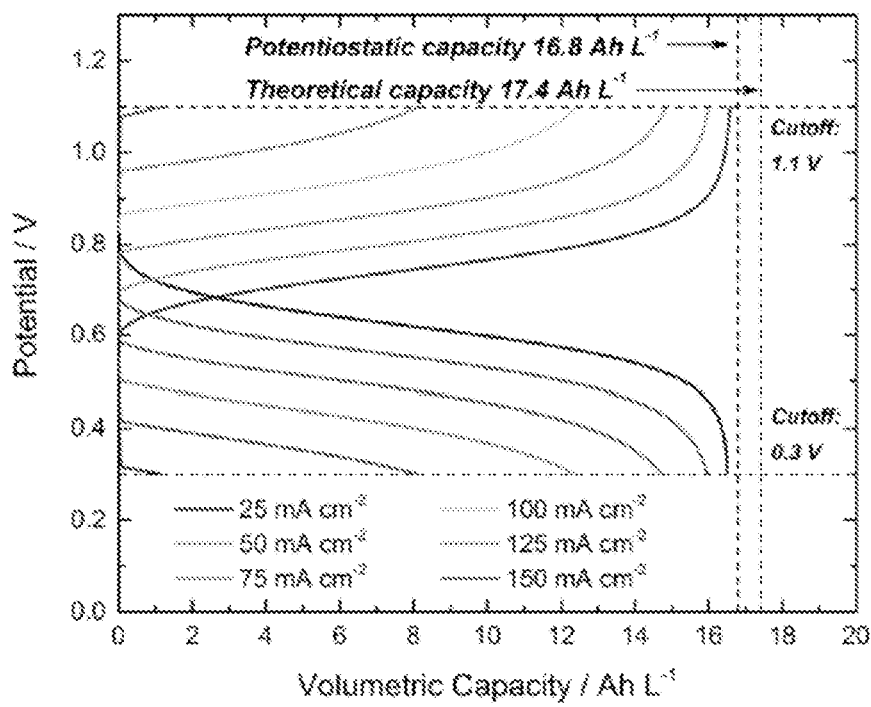
Figure 11D:
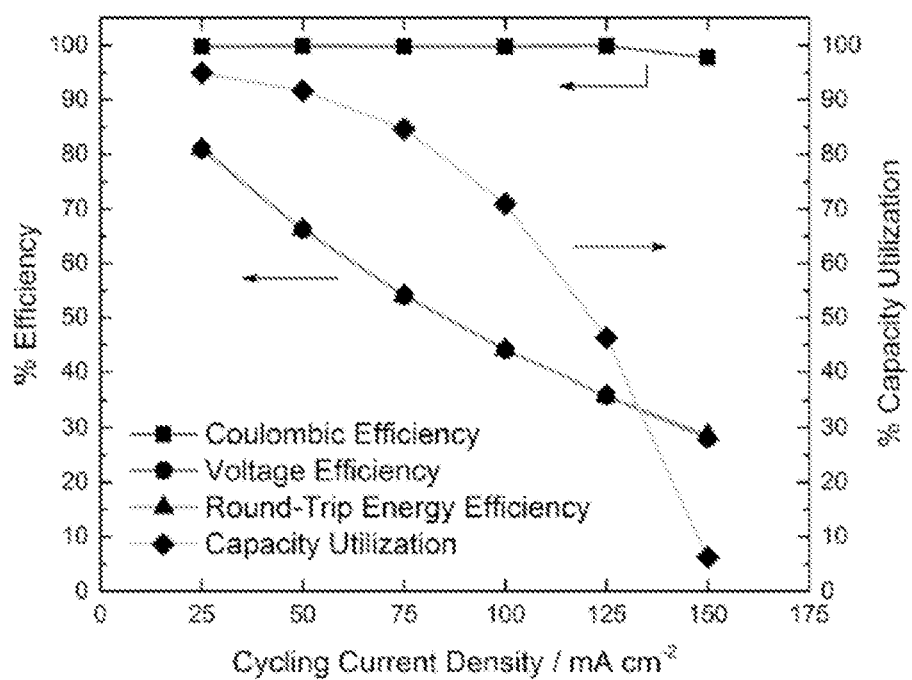

FIG. 10 shows cyclic voltammograms for 1 and 2. When used in the negolyte and posolyte in a RFB, respectively, the expected cell potential is 0.748 V. With the high solubilities of both electrolytes in water, the theoretical volumetric capacity (including both electrolytes in the denominator) is 26 Ah L$^{-1}$, and the theoretical energy density is 20 Wh L$^{-1}$.

Cell hardware from Fuel Cell Tech was used to assemble a zero-gap flow cell configuration, similar to what was previously reported.[12] POCO graphite flow plates with serpentine flow fields were used for both sides. Electrodes of 5 cm$^2$ geometric surface area comprised a stack of four sheets of Sigracet SGL 39AA porous carbon paper, which had been pretreated by baking in air at 400° C. for 24 h. A sheet of Selemion DSV membrane (Asahi Glass Co., Ltd.), which had been stored in 0.25 M NaCl solution, served as the ion-selective membrane. The rest of the space was gasketed by Viton sheets. The electrolytes were fed into the cell through FEP tubing, at a rate of 60 mL min-1 controlled by Cole-Parmer Masterflex L/S peristaltic pumps. Cyclic voltammetry and rotating disk electrode voltammetry (see below) were performed using a Gamry Reference 3000 potentiostat. Cell polarization, impedance spectroscopy measurements, and charge-discharge cycling were performed using a BioLogic BCS-815 battery cycling system or a Gamry Reference 3000 potentiostat. Where employed, galvanostatic charging and discharging of a full electrochemical cell was performed at the predefined current densities until the cell voltage rose or fell to 1.1 V or 0.3 V respectively, after which there would be a 10-second hold at open circuit potential before the next half-cycle (charge or discharge). For galvanostatic cycling with potential holds, cycling was done as described above but once the predefined potential cutoffs were reached, the cell was maintained at the same voltage until the magnitude of the charging or discharging current density had decreased to 1 mA cm$^2$. A 10-second hold at open circuit potential followed by the next cycling step would then proceed as before.

A cell was assembled using 1.3 M 1 in water (6.00 mL) as the negolyte and 1.3 M 2 in water (6.00 mL) as the posolyte, separated by an anion-conducting membrane (Selemion DSV, 110 μm×5 cm$^2$). To prevent atmospheric oxygen from reacting with either electrolyte and promoting decomposition by raising the solution pH, the entire cell was operated inside an argon-filled glovebox. Both electrolyte solutions were also stirred overnight under an argon atmosphere immediately prior to use.

The resulting neutral pH aqueous RFB showed an open circuit voltage (OCV) that increased nearly linearly from 0.61 V at 10% state of charge (SOC) to 0.79 V at 90% SOC (FIG. 11). Polarization studies conducted at room temperature (20° C.) showed a peak galvanic power density of 60 mWcm$^{-2}$ at a current density of 150 mA cm$^{-2}$. The relatively low peak power and current densities were due in large part to the resistivity of the membrane [~2.2 Ωcm$^2$, determined by high-frequency electrochemical impedance spectroscopy (EIS) in the full cell], which was responsible for approximately 75-90% of the area-specific resistance (ASR) of the entire cell (~2.5 $\Omega cm^2$, DC polarization). Because of the high Coulombic efficiency (99.8-99.9% for current densities of 25-125 mA $cm^{-2}$), the voltage efficiency dominated the overall round-trip energy efficiency.

Figure 12A:
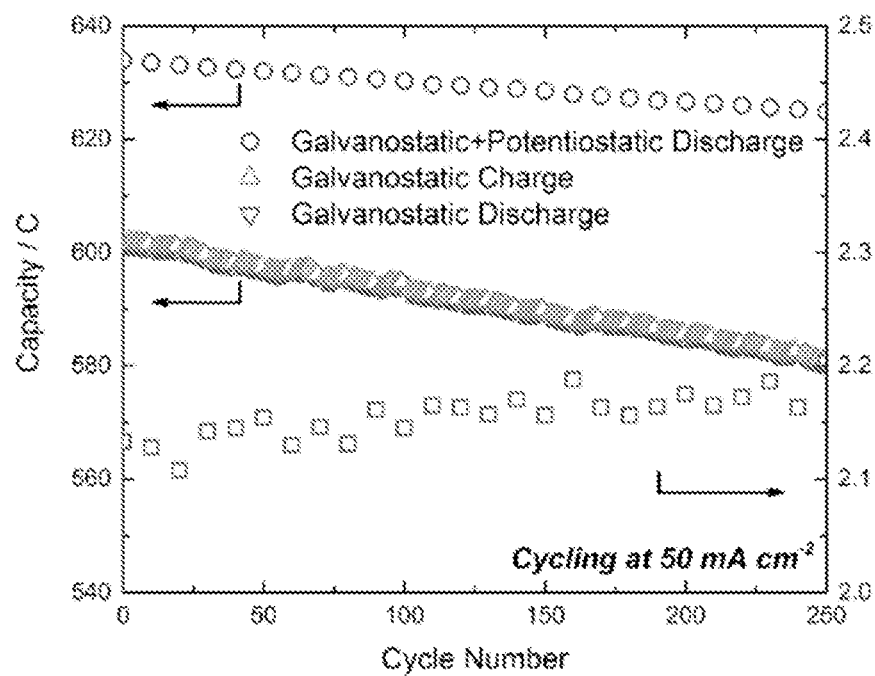
FIG. 12. (a) Evolution of the capacity of the ½ RFB at a concentration of 1.3 M/1.3 M during extended cell cycling at 50 mA cm² (triangles, left axis). At every 10th cycle, the potential was maintained at the end of each charge or discharge until the current fell below 1 mA cm² (circles, left axis). The high-frequency ASR, which was measured immediately after every $10^{th}$ cycle, is also indicated (squares, right axis). (b) Representative voltage vs time traces of selected cycles. Cycles that were multiples of (10n$^{-1}$) were chosen because every 10th cycle was different (see above).
Figure 12B:
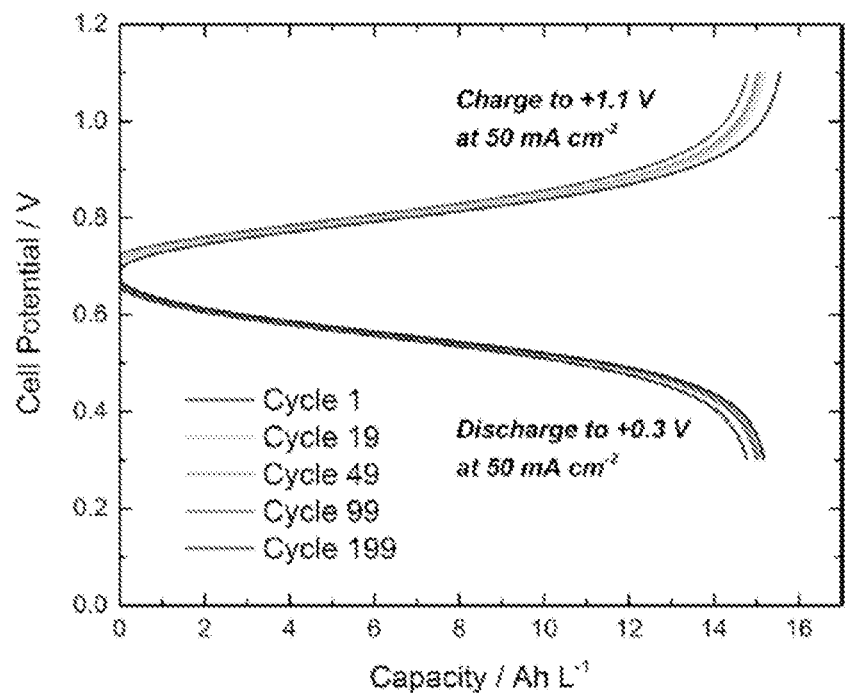

An extended charge-discharge study was performed to investigate the stabilities of 1 and 2 (FIG. 12). To minimize the effect of oxygen on capacity retention, the cell was charged to ~100% SOC and 1.00 mL of posolyte was withdrawn through a syringe. The cell was then cycled at a constant current of 50 mA $cm^{-2}$, with a potential cutoff of 1.1 V while charging and 0.3 V while discharging. The average Coulombic efficiency during galvanostatic cycling was >99.95%. Every 10th cycle, the potential was maintained at the cutoff voltage after galvanostatic charging and discharging until the current dropped below 1 mA $cm^{-2}$. This allowed the entire capacity of the cell to be measured, independent of any changes to the membrane ASR.

The membrane ASR was measured using potentiostatic EIS at 0.3 V immediately following the potentiostatic discharge from each 10th cycle (i.e., always at ~0% SOC). The membrane ASR was found to increase very slowly over the course of 2 weeks while showing diurnal variations of ~0.05 $\Omega cm^2$ depending on the ambient temperature. Changes to the membrane ASR manifested as ripples in the cell capacity with a period of 1 day. Because the ASR slowly increased with time, diminished capacity utilization resulted in a larger apparent decrease in cell capacity over time compared to cycling with a potential hold. Thus, cycling with a potential hold provides a more accurate measure of reactant stability in an operating cell than conventional galvanostatic cycling. In addition, because the potential holds ensure that the entire SOC range is accessed, the cell does not have to achieve a steady-state SOC range, which could otherwise obscure the actual capacity retention rate.

At a concentration of 1.3 M for 1 and 2, the cell capacity had fallen to 98.58% of its original value (633.981 to 624.952 C) over 250 cycles (which spanned 14.0 days), representing a capacity retention of 99.9943%/cycle or 99.90%/day. The corresponding capacity fade rates are 0.0057%/cycle and 0.10%/day, respectively. The former figure attributes all of the capacity fade to electrochemical cycling whereas the latter figure attributes it all to chemical decay; thus, these figures represent upper limits if both mechanisms contribute significantly to capacity fade.

Even better capacity retention rates are achievable at lower, but still reasonable, reactant concentrations. Because operation in air led to a very fast drop in cell capacity, another cell was set up inside a nitrogen-filled glove bag with 7.50 mL of 0.75 M 1 as the negolyte and 3.25 mL of 1.00 M 2 as the posolyte, both at 100% SOC. The glove bag environment contains more oxygen than does the glovebox, but this is mitigated by the excess of reduced 1 that is present.

Figure 13A:
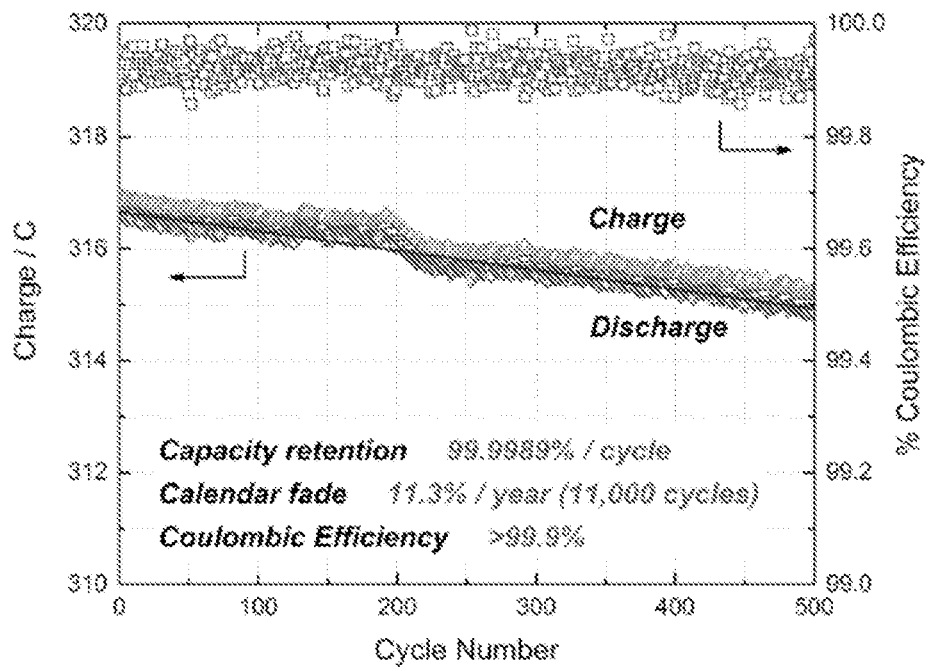
FIG. 13. (a) Cycling of a ½ pH 7 cell at 50 mA cm$^{-2}$ in the presence of an excess of reduced 1 such that the posolyte is capacity-limiting. Bottom traces, left axis: Evolution of the cell charge (upward-pointing triangles) and discharge (downward-pointing triangles) capacity as functions of cycle number. Top trace, right axis: Coulombic efficiency of the cell for each charge-discharge cycle (red squares). The line is the best fit line to the discharge capacity of the cell between cycles 1 and 500. (b) Representative voltage vs time traces of selected cycles. Inset: Magnification of the potentiostatic regions of each charge-discharge cycle, showing the evolution of the potentiostatic capacity of the cell with cycle number. Inset traces are vertically offset from each other for clarity.
Figure 13B:
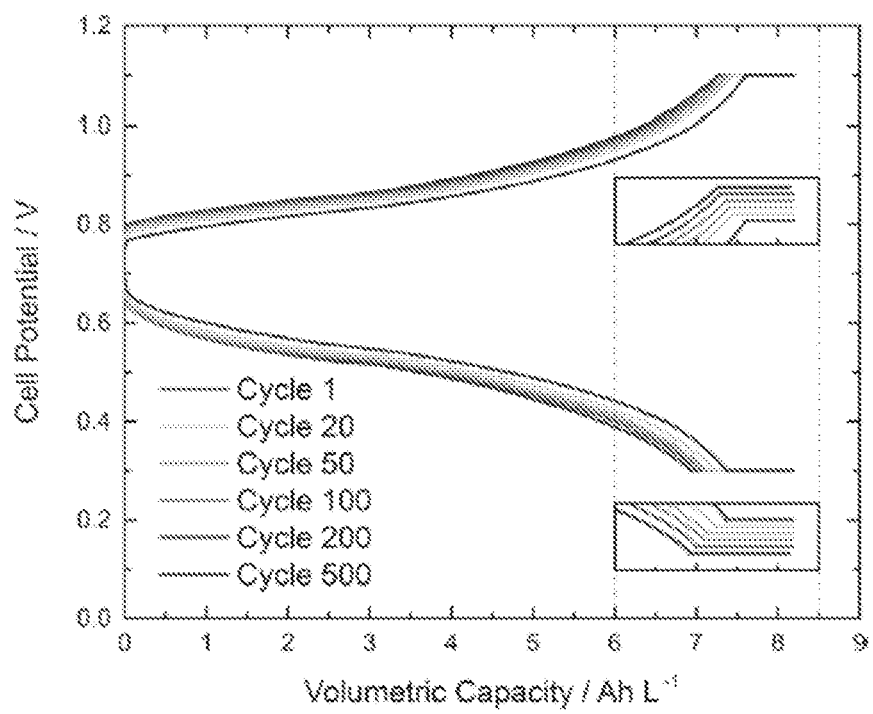

This ratio of reactant concentrations was empirically chosen because it minimized water crossover from one reservoir to the other. Next, the cell was cycled for 500 cycles at 50 mA $cm^2$, this time with a voltage hold after every cycle (FIG. 13). The 500 cycles required 16.6 days to complete. The average capacity retention over the 500 cycles was 99.9989%/cycle at an average Coulombic efficiency greater than 99.9%, which reflects a capacity fade rate roughly 3-5 times lower (0.0011%/cycle; 0.033%/day) at the same current density than for the cell described in FIG. 12. The corresponding calendar fade rate is 11.3%/year, of which ~6%/year comes from reactant crossover as calculated from the reactant permeabilities. Compared to the methyl viologen/(ferrocenylmethyl) trimethylammonium chloride system, the capacity fade per cycle is reduced by a factor of 10 (vs 0.013%/cycle at 0.5 M) to 40 (vs 0.042%/cycle at 0.7 M) and the capacity fade per day by a factor of 20 (vs 0.58%/day at 0.5 M) to 40 (vs 1.3%/day at 0.7 M), despite still being at a higher reactant concentration.

The calendar fade rate of a ½ cell was found to be independent of the cycling current density, implying that the predominant source of capacity fade is unlikely to be electrochemical decomposition, but rather chemical decomposition or reactant crossover. NMR analyses were performed to evaluate the extent to which chemical decomposition of the reactants at either charge state contributed to capacity loss. No trace of either reactant was detectable by NMR in the other reactant reservoir after 250 cycles (at high concentration) or 500 cycles (at lower concentration). Both reactants, in both their oxidized and reduced states, cycled or uncycled, were found by NMR to be stable in aqueous solution. Observed only with experiments in the glovebag but not the glovebox, the dealkylation of 1 with hydroxide formed from the reaction of its reduced form with oxygen was identified as a decomposition pathway.

Our experiments imply that as long as oxygen is strictly excluded from the reactants, both 1 and 2 are electrochemically and chemically stable. From the examples in the literature, the percentage capacity fade rate is generally higher at higher concentrations of reactants, which suggests that a significant portion of the capacity fade is due to bimolecular reactions of the reactants with themselves. Presumably, these pathways are suppressed by the positive charges, which greatly increase the Coulombic repulsion between reactant molecules. Further information is provided in Beh et al. *ACS Energy Lett.* 2017, 2, 639 and its supporting information, which is hereby incorporated by reference.

Example 8. Further Posolytes and Negolytes

Diquaternized derivatives of 2,2'-dipyridyl are known to have reduction potentials that are significantly lower (by ~300 mV) than those of 4,4'-dipyridyl.[13]

Figure 14:
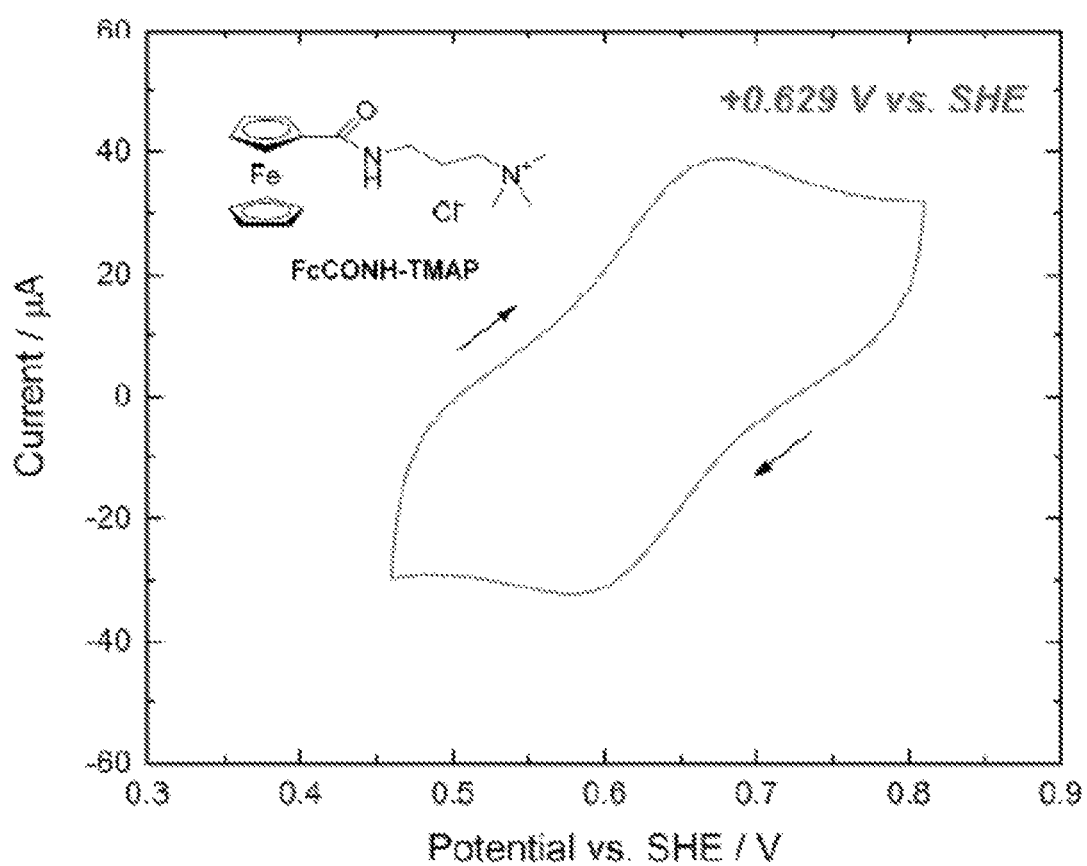
FIG. 14. Cyclic voltammogram of 7. Conditions: 1 mM in 0.5 M NaCl, 100 mV s-1 sweep rate. Three-electrode cyclic voltammetry tests were performed using a glassy carbon electrode (5.0 mm diameter), a Ag/AgCl reference electrode (BASi, presoaked in 3 M NaCl solution), and a platinum wire counter electrode. The 10th cycle is shown.

For an alternative posolyte, we synthesized N-((3-trimethylammonio)propyl) ferrocenecarboxamide chloride 7 and determined its reduction potential to be +0.63 V vs SHE (+1.04 V vs RHE) at pH 7. This figure is ~240 mV higher than that of 2, giving a theoretical cell potential of 0.99 V against 1. Because an amide linkage is hydrolyzed in pH 7 water at a rate with a corresponding half-life of several centuries,[14] 7 may be a suitably stable and synthetically accessible replacement for 2 in the future. The cyclic voltammogram of 7 is shown in FIG. 14.

Example 9. Synthesis of Compound 7

230.0 mg (1.00 mmol) of ferrocenecarboxylic acid, 156.0 mg (1.20 mmol) of 3-chloropropylamine hydrochloride, 513.9 mg (1.20 mmol) of (1-cyano-2-ethoxy-2-oxoethylidenaminooxy)dimethylaminomorpholinocarbenium hexafluorophosphate (COMU), and 323.1 mg (2.50 mmol) of DIPEA were stirred in 10 mL of DMF. After 2 hours, the reaction was diluted with 50 mL of EtOAc, then washed successively with 1 M NaOH (3×50 mL), 1 M HCl (3×50 mL), water (1×50 mL), 5% aqueous $Na_2S_2O_4$ (1×100 mL), then finally 5% aqueous LiCl (1×100 mL). The organic phase was dried over anhydrous $Na_2SO_4$, filtered, and evaporated to give pure 4. Yield: 300.4 mg (98.3%) of an orange-yellow powder. 1H NMR (500 MHz, DMSO-$d_6$) δ 7.85 (t, 1H), 4.77

(t, 2H), 4.33 (t, 2H), 4.14 (s, 5H), 3.69 (t, 2H), 3.28 (q, 2H), 1.95 (m, 2H); 13C NMR (125 MHz, DMSO-d$_6$) δ 168.9, 76.5, 69.7, 69.1, 68.0, 43.0, 36.1, 32.4. 258.9 mg of 4 produced in the previous step was stirred with 25 mL of a 4.2 M solution of trimethylamine in ethanol. The solution was sealed in a heavy-walled glass tube and heated to 60° C. for 5 days. Following that, all volatiles were removed in vacuo to give 7. Yield: 288.9 mg (93.5%) of a dark brown foam. 1H NMR (500 MHz, CDCl$_3$) δ 7.93 (t, 1H), 4.77 (t, 2H), 4.35 (t, 2H), 4.17 (s, 5H), 3.24 (m, 4H), 3.06 (s, 9H), 1.91 (m, 2H); 13C NMR (125 MHz, CDCl$_3$) δ 174.4, 73.6, 71.6, 70.0, 68.3, 64.3, 52.9 (3 separate peaks), 36.2, 23.0.

Other embodiments are described in the claims.

REFERENCES

1. Darling, R. M.; Gallagher, K. G.; Kowalski, J. A.; Ha, S.; Brushett, F. R. *Energy Environ. Sci.* 2014, 7, 3459.
2. Liu, T.; Wei, X.; Nie, Z.; Sprenkle, V.; Wang, W. *Advanced Energy Materials* 2016, 6, 1501449.
3. Mortimer, R. J. *Chemical Society Reviews* 1997, 26, 147.
4. Zhang, D.-W.; Tian, J.; Chen, L.; Zhang, L.; Li, Z.-T. *Chemistry—An Asian Journal* 2015, 10, 56.
5. Anne L. Rieger, J. O. E. *J. Org. Chem.* 1988, 53, 1481.
6. Perry, M. L.; Darling, R. M.; Zaffou, R. *Electrochemical Society Transactions* 2013, 53, 7.
7. Soloveichik, G. L. *Chem Rev* 2015.
8. Adams, G. B.; Hollandsworth, R. P.; Webber, B. D. *Rechargeable Alkaline Zinc/Ferricyanide Battery*, DOE, 1979.
9. Esswein, A. J.; Goeltz, J.; Amadeo, D. In U.S. Pat. App.; Sun Catalytix Corporation: 2014; Vol. US 2014/0051003 A1.
10. Bird, C. L.; Kuhn, A. T. *Chemical Society Reviews* 1981, 10, 49.
11. Knox, G. R.; Pauson, P. L. *Journal of the Chemical Society (Resumed)* 1958, 692.
12. Lin, K.; Gomez-Bombarelli, R.; Beh, E. S.; Tong, L.; Chen, Q.; Valle, A.; Aspuru-Guzik, A.; Aziz, M. J.; Gordon, R. G. *Nat. Energy* 2016, 1, 16102
13. Krishnan, C. V.; Creutz, C.; Schwarz, H. A.; Sutin, N. *J. Am. Chem. Soc.* 1983, 105, 5617-5623.
14. Smith, R. M.; Hansen, D. E. *J. Am. Chem. Soc.* 1998, 120, 8910-8913.

What is claimed is:

1. A water-soluble ferrocene derivative being

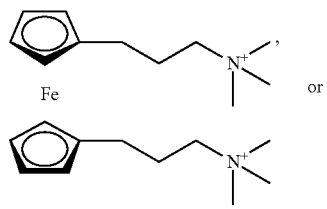

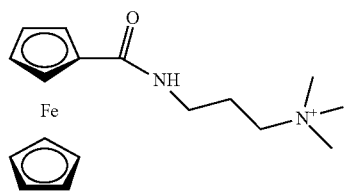

or a salt thereof.

2. A water-soluble ferrocene derivative being a chloride, bromide, or BF$_4^-$ salt of

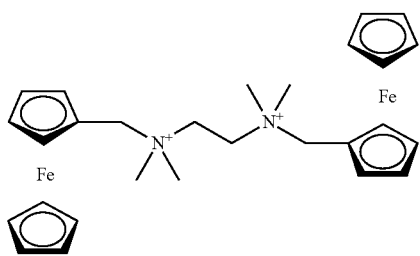

UNITED STATES PATENT AND TRADEMARK OFFICE
CERTIFICATE OF CORRECTION

| | | |
|---|---|---|
| PATENT NO. | : 11,923,581 B2 | Page 1 of 1 |
| APPLICATION NO. | : 16/324951 | |
| DATED | : March 5, 2024 | |
| INVENTOR(S) | : Gordon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 328 days.

Signed and Sealed this
Eighth Day of October, 2024

Katherine Kelly Vidal
*Director of the United States Patent and Trademark Office*